(12) United States Patent
Zheng et al.

(10) Patent No.: US 12,456,452 B2
(45) Date of Patent: Oct. 28, 2025

(54) TEXT DATA PROCESSING METHOD AND APPARATUS

(71) Applicant: HUAWEI TECHNOLOGIES CO., LTD., Guangdong (CN)

(72) Inventors: Nianzu Zheng, Shenzhen (CN); Disong Wang, Shenzhen (CN); Liqun Deng, Shenzhen (CN); Yang Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 304 days.

(21) Appl. No.: 18/356,738

(22) Filed: Jul. 21, 2023

(65) Prior Publication Data

US 2023/0360634 A1 Nov. 9, 2023

Related U.S. Application Data

(63) Continuation of application No. PCT/CN2022/072441, filed on Jan. 18, 2022.

(30) Foreign Application Priority Data

Jan. 22, 2021 (CN) .......................... 202110091046.9

(51) Int. Cl.
*G10L 13/08* (2013.01)
*G10L 25/30* (2013.01)

(52) U.S. Cl.
CPC .............. *G10L 13/08* (2013.01); *G10L 25/30* (2013.01)

(58) Field of Classification Search
CPC .............................. G10L 15/28; G10L 15/063
(Continued)

(56) References Cited

U.S. PATENT DOCUMENTS

| 12,051,400 B1* | 7/2024 | Sima ....................... G10L 25/18 |
| 2012/0065977 A1* | 3/2012 | Tepperman ............. G10L 13/08 |
| | | 704/E13.011 |

(Continued)

FOREIGN PATENT DOCUMENTS

| CN | 111798832 A | 10/2020 |
| CN | 112151003 A | 12/2020 |

(Continued)

OTHER PUBLICATIONS

Jia et al., "Transfer Learning from Speaker Verification to Multispeaker Text-To-Speech Synthesis," Proceedings of 32nd Conference on Neural Information Processing Systems (NIPS 2018), Jun. 12, 2018, 11 pages.

(Continued)

*Primary Examiner* — Bharatkumar S Shah
(74) *Attorney, Agent, or Firm* — Fish & Richardson P.C.

(57) ABSTRACT

The present disclosure relates to text data processing methods and apparatuses. One example method includes obtaining target text, where a phoneme of the target text includes a first phoneme and a second phoneme that are adjacent to each other. Feature extraction is performed on the first phoneme and the second phoneme to obtain a first audio feature of the first phoneme and a second audio feature of the second phoneme. By using a target recurrent neural network (RNN) and based on the first audio feature, first speech data corresponding to the first phoneme is obtained. By using the target RNN and based on the second audio feature, second speech data corresponding to the second phoneme is obtained. By using a vocoder and based on the first speech data and the second speech data, audio corresponding to the first phoneme and audio corresponding to the second phoneme are obtained.

20 Claims, 11 Drawing Sheets

(58) Field of Classification Search
USPC .......................................................... 704/200
See application file for complete search history.

(56) References Cited

U.S. PATENT DOCUMENTS

| | | | |
|---|---|---|---|
| 2018/0308487 A1* | 10/2018 | Goel | G10L 15/1815 |
| 2019/0130894 A1* | 5/2019 | Jin | G10L 21/00 |
| 2020/0342849 A1* | 10/2020 | Yu | G10L 13/047 |
| 2021/0065699 A1* | 3/2021 | Kaushik | G10L 15/16 |
| 2023/0087916 A1* | 3/2023 | Lin | G10L 13/08 704/258 |
| 2023/0260501 A1* | 8/2023 | Trueba | G10L 15/08 704/200 |
| 2023/0360634 A1* | 11/2023 | Zheng | G10L 13/08 |

FOREIGN PATENT DOCUMENTS

| | | | |
|---|---|---|---|
| CN | 112885328 A | 6/2021 | |
| GB | 2574098 A * | 11/2019 | G06V 10/7553 |
| WO | WO-2019214361 A1 * | 11/2019 | G10L 15/08 |
| WO | WO-2022260432 A1 * | 12/2022 | G06F 3/167 |

OTHER PUBLICATIONS

Wang et al., "TACOTRON: Towards End-To-End Speech Synthesis," CoRR, submitted on Apr. 6, 2017, arXiv:1703.10135v2, 10 pages.
Sotelo et al., "CHAR2WAV: End-To-End Speech Synthesis," ICLR 2017 workshop, Apr. 24, 2017, 6 pages.
Extended European Search Report in European Appln. No. 22742133.6, mailed on Apr. 11, 2024, 11 pages.
International Search Report and Written Opinion in International Appln. No. PCT/CN2022/072441, mailed on Apr. 15, 2022, 23 pages (with English translation).
Jia et al., "Transfer Learning from Speaker Verification to Multispeaker Text-To-Speech Synthesis," Proceedings of 32nd Conference on Neural Information Processing Systems, Jun. 12, 2018, 11 pages.
Sotelo et al., "CHAR2WAV: End-To-End Speech Synthesis," Proceedings of International Conference on Learning Representations, Apr. 24, 2017, 6 pages.
Extended European Search Report in European Appln. No. 22742133.6, mailed on Apr. 11, 2024, 11 pages.

* cited by examiner

TEXT DATA PROCESSING METHOD AND APPARATUS

CROSS-REFERENCE TO RELATED APPLICATIONS

This application is a continuation of International Application No. PCT/CN2022/072441, filed on Jan. 18, 2022, which claims priority to Chinese Patent Application No. 202110091046.9, filed on Jan. 22, 2021. The disclosures of the aforementioned applications are hereby incorporated by reference in their entireties.

TECHNICAL FIELD

This application relates to the field of artificial intelligence, and in particular, to a text data processing method and apparatus.

BACKGROUND

Artificial intelligence (AI) is a theory, a method, a technology, or an application system that simulates, extends, and expands human intelligence by using a digital computer or a machine controlled by a digital computer, to perceive an environment, obtain knowledge, and achieve an optimal result based on the knowledge. In other words, artificial intelligence is a branch of computer science and attempts to understand essence of intelligence and produce a new intelligent machine that can react in a similar manner to human intelligence. Artificial intelligence is to study design principles and implementation methods of various intelligent machines, so that the machines have perception, inference, and decision-making functions.

With continuous development of multimedia communication technologies, speech synthesis, as one of important manners of man-machine communication, has attracted wide attention from researchers due to its advantages of convenience and fastness. Text to speech (text to speech, TTS) may convert text into corresponding audio. With rapid development of deep learning in recent years, a text to speech technology has been gradually shifted from parameterized speech synthesis based on a statistical model such as a simple statistical model (for example, a hidden Markov model, HMM) to end-to-end audio synthesis based on a deep neural network model.

During existing implementation, autoregressive processing of intra-phoneme and inter-phoneme audio features of text is implemented by using a recurrent neural network (recurrent neural network, RNN). The autoregressive processing is predicting speech data of a current frame based on a hidden layer output obtained by processing an audio feature of a previous frame by using the RNN. However, due to an iterative output feature of autoregression, an audio synthesis speed of the RNN is low.

SUMMARY

According to a first aspect, this application provides a text data processing method, including:
  obtaining target text, where a phoneme of the target text includes a first phoneme and a second phoneme that are adjacent to each other.
  A phoneme (phoneme) may also be referred to as a pronunciation phoneme, and is a minimum speech unit obtained through division based on a natural attribute of speech. It can be learned, from analysis based on a pronunciation action in a syllable, that one action forms one phoneme. Phonemes are classified into vowels and consonants. For example, a Chinese syllable a (for example, a first tone: a) has only one phoneme, ai (for example, a fourth tone: ai) has two phonemes, and dai (for example, a first tone: dai) has three phonemes.

After the target text is obtained, the target text may be preprocessed into a sequence adapted to an input format of a TTS model. For example, a server can perform text normalization on the target text to convert non-standard target text into a pronunciation format, perform word segmentation processing to segment a sentence in the target text in a unit of a word, to avoid sentence ambiguity, perform prosody analysis to predict a pause rhythm and/or an accent of each sentence in the target text, convert a word in the target text into a phoneme level, to obtain a phoneme string (that is, a phoneme of the target text), and convert the phoneme string into a sequence format (which may be referred to as an ID sequence in a subsequent embodiment) required by the TTS model.

The phoneme of the target text may include the first phoneme and the second phoneme that are adjacent to each other. The phoneme of the target text is a phoneme sequence in which a plurality of phonemes are arranged in a specific order, and the first phoneme and the second phoneme may be any two adjacent phonemes in the foregoing phoneme sequence.

The method further includes: performing feature extraction on the first phoneme and the second phoneme to obtain a first audio feature of the first phoneme and a second audio feature of the second phoneme.

An encoder (for example, a network structure or a hybrid network structure, such as a convolutional neural network (convolutional neural network, CNN), a recurrent neural network (recurrent neural network, RNN), or a transformer) can be used to perform feature extraction on the phoneme of the target text. For example, a serial structure of the encoder may include but is not limited to an LUP layer (a dimension of the LUP layer is 512), three filter layers, and a bidirectional circular neural network layer, where each filter layer includes 512 convolution kernels (kernel), a size of each convolution kernel is 5, the bidirectional circular neural network layer includes a hidden layer, and a dimension of the bidirectional circular neural network layer is 512. The encoder may be used to: convert the phoneme of the target text into a hidden layer representation sequence (which may also be referred to as a feature vector), that is, map the phoneme of the target text to an intermediate implicit representation H, and generate a feature vector for each phoneme. These feature vectors include rich phoneme context information. After the encoder converts the phoneme of the target text into the feature vector, prosody prediction may be performed on the feature vector obtained by the encoder, to obtain an audio feature that may include richer features.

The method includes: obtaining, by using a target recurrent neural network RNN and based on the first audio feature, first speech data corresponding to the first phoneme, and obtaining, by using the target RNN and based on the second audio feature, second speech data corresponding to the second phoneme, where a step of obtaining the first speech data corresponding to the first phoneme and a step of obtaining the second speech data corresponding to the second phoneme are concurrently performed.

Concurrent performing means that when the target RNN calculates the first speech data based on the first audio feature, the target RNN calculates the second speech data based on the second audio feature.

In an existing implementation, after an output of a hidden layer is obtained when the first speech data is calculated, the target RNN starts to calculate the second speech data. For example, a first target audio feature is an audio feature of a last frame in the first audio feature, and a second target audio feature is an audio feature of a first frame in the second audio feature. In one case, that the target RNN calculates speech data may include:

The hidden layer starts to process the first target audio feature, the hidden layer calculates an output of a first hidden sub-layer, an output layer starts to process the output of the first hidden sub-layer, and the output layer calculates speech data. The hidden layer starts to process the second target audio feature, the hidden layer calculates an output of a second hidden layer, the output layer starts to process the output of the second hidden layer, and the output layer calculates speech data. The hidden layer may start to process the second target audio feature after the output layer starts to process the output of the first hidden sub-layer and before the output layer calculates the speech data. In other words, time at which the target RNN calculates the first speech data may overlap with time at which the target RNN calculates the first speech data. In this application, time overlapping in the foregoing case does not mean that the target recurrent neural network RNN concurrently determines the first speech data corresponding to the first phoneme and the second speech data corresponding to the second phoneme.

In this application, the target RNN includes a hidden layer and an output layer, and the first audio feature and the second audio feature may be audio features of a plurality of frames. For example, a first target audio feature is an audio feature of a last frame in the first audio feature, and a second target audio feature is an audio feature of a first frame in the second audio feature. That the target RNN calculates speech data may include:

The hidden layer starts to process the first target audio feature, the hidden layer calculates an output of a first hidden sub-layer, the output layer starts to process the output of the first hidden sub-layer, and the output layer calculates speech data.

The hidden layer starts to process the second target audio feature, the hidden layer calculates an output of a second hidden layer, the output layer starts to process the output of the second hidden layer, and the output layer calculates speech data.

In this embodiment, the concurrency means that the hidden layer of the target RNN starts to process the second target audio feature before the hidden layer calculates the output of the first hidden sub-layer. In other words, time at which the hidden layer of the target RNN starts to process the second target audio feature does not depend on time at which the hidden layer completes calculation of the output of the first hidden sub-layer, but depends on obtaining time of the second target audio feature. After the second target audio feature is obtained, the hidden layer of the target RNN may directly start to process the second target audio feature.

It should be understood that, in addition to a case in which the hidden layer of the target RNN starts to process the second target audio feature before the hidden layer calculates the output of the first hidden sub-layer, time at which the target RNN processes the second audio feature further needs to overlap, to some extent, with time at which the target RNN processes the first audio feature, so as to avoid the following case: the hidden layer of the target RNN starts to process the second target audio feature prematurely, and the target RNN starts to process the first audio feature only after processing the second audio feature.

In an existing implementation, when the RNN processes the audio feature to obtain the speech data, for adjacent frames of different phonemes, an input of the hidden layer of the RNN not only includes an output obtained by processing an audio feature of a current frame by an input layer, but also includes an output obtained by processing an audio feature of a previous frame by the hidden layer. Therefore, when processing an audio feature of a last frame in two adjacent frames between different phonemes, the RNN can process the audio feature of the current frame only after waiting for the hidden layer to process the audio feature of the previous frame and obtain the output of the hidden layer. That is, an input used by the target RNN to calculate the second speech data not only includes the second audio feature, but also includes the output of the hidden layer in the process of calculating the first speech data. That is, the target RNN can start to calculate the second speech data only after the output of the hidden layer in the process of calculating the first speech data is obtained. As a result, the target RNN takes long time to process the audio feature. In this embodiment, the target RNN concurrently processes the first audio feature and the second audio feature. This decouples a processing process of the first audio feature and a processing process of the second audio feature, and reduces duration for processing the audio feature by the target RNN.

The method includes: obtaining, by using a vocoder and based on the first speech data and the second speech data, audio corresponding to the first phoneme and audio corresponding to the second phoneme.

In this embodiment of this application, when the RNN processes the audio feature of the last frame in the two adjacent frames between different phonemes, the input of the hidden layer does not include the output obtained by processing the audio feature of the previous frame by the hidden layer, so that when processing the audio feature of the last frame in the two adjacent frames between different phonemes, the RNN can process the audio feature of the current frame without waiting for the hidden layer to process the audio feature of the previous frame and obtain the output of the hidden layer. That is, the hidden layer may be configured to determine an output of a second hidden sub-layer based on the second audio feature before determining the output of the first hidden sub-layer, thereby further reducing time overheads for processing the audio feature by the RNN.

In a possible implementation, the target RNN includes a hidden layer and an output layer, and the obtaining, by using a target recurrent neural network RNN and based on the first audio feature, first speech data corresponding to the first phoneme, and obtaining, by using the target RNN and based on the second audio feature, second speech data corresponding to the second phoneme includes:

determining, by using the hidden layer, an output of a first hidden layer based on the first audio feature;

determining, by using the output layer, the first speech data based on the output of the first hidden layer;

determining, by using the hidden layer, an output of a second hidden layer based on the second audio feature; and determining, by using the output layer, the second speech data based on the output of the second hidden layer, where the output of the first hidden layer is not used as an input of the hidden layer when the hidden layer determines the output of the second hidden layer.

When the target RNN processes the second audio feature, the hidden layer may determine, based on the second target audio feature, the output of the second hidden sub-layer, and the output layer may determine the second speech sub-data based on the output of the second hidden sub-layer. Different from the existing implementation in which the hidden layer determines the output of the second hidden sub-layer based on the second target audio feature and the output of the first hidden sub-layer, in this embodiment, the output of the first hidden sub-layer is not used as the input of the hidden layer when the hidden layer determines the output of the second hidden sub-layer. The first target audio feature $x_{t-1}$ and the second target audio feature $x_t$ are audio features of adjacent frames of different phonemes. When the RNN processes the second target audio feature $x_t$, a result obtained by processing the second target audio feature $x_t$ by the input layer U of the RNN may be used as the input of the hidden layer of the RNN. In addition, the output $s_{t-1}$ of the hidden layer obtained after the hidden layer of the RNN processes a result obtained by processing the first target audio feature $x_t$ by the input layer U is not used as the input of the hidden layer of the RNN. It is equivalent to that, when the RNN processes the audio feature of the last frame in two adjacent frames between different phonemes, the input of the hidden layer does not include the output obtained by processing the audio feature of the previous frame by the hidden layer. That is, for different phoneme units, the autoregressive manner is not used between the different phonemes. This reduces computing power and processing time required by the RNN to process the audio feature.

It should be understood that, when the target RNN processes the second target audio feature, the input of the hidden layer of the target RNN includes only the result obtained by processing the second target audio feature by the input layer of the RNN. This is not limited in embodiments of this application.

In a possible implementation, duration of the first phoneme is N frames, a quantity of first audio features is N, each of the N first audio features corresponds to one of the N frames, the N first audio features include a first target audio feature and a third target audio feature, a frame corresponding to the first target audio feature is a frame before a frame corresponding to the third target audio feature, and the first speech data includes first speech sub-data corresponding to the first target audio feature and third speech sub-data corresponding to the third target audio feature.

The determining, by using the hidden layer, an output of a first hidden layer based on the first audio feature includes:
determining, by using the hidden layer, an output of a third hidden sub-layer based on the third target audio feature, and
 determining, by using the hidden layer, an output of a first hidden sub-layer based on the first target audio feature and the output of the third hidden sub-layer.

The determining, by using the output layer, the first speech data based on the output of the first hidden layer includes:
 determining, by using the output layer, the third speech sub-data based on the output of the third hidden sub-layer, and
 determining, by using the output layer, the first speech sub-data based on the output of the first hidden sub-layer.

When the RNN processes the third audio feature, the hidden layer may determine an output of a third hidden sub-layer based on the third target audio feature. Specifically, the hidden layer may determine the output of the third hidden sub-layer based on an output of the input layer obtained after the input layer of the RNN processes the third target audio feature. The output layer may be used to determine third speech sub-data based on the output of the third hidden sub-layer. The third speech sub-data may be a mel spectrogram MEL or a bark spectrogram Bark.

When the RNN processes the first audio feature, the hidden layer may determine the output of the first hidden sub-layer based on the first target audio feature and the output of the third hidden sub-layer, and the output layer may determine first speech sub-data based on the output of the first hidden layer. It is equivalent to that, for each frame of a same phoneme, the input of the hidden layer of the RNN not only includes an output obtained by processing an audio feature of a current frame by the input layer, but also includes an output obtained by processing an audio feature of a previous frame by the hidden layer. That is, for each phoneme unit, an autoregressive manner is used inside the phoneme unit.

In a possible implementation, the first audio feature includes at least one of the following information: fundamental frequency information or energy information of the first phoneme, and the second audio feature includes at least one of the following information: fundamental frequency information or energy information of the second phoneme.

In a possible implementation, the first speech data and the second speech data each are a mel spectrogram MEL or a bark spectrogram Bark.

In a possible implementation, the target RNN is obtained by performing knowledge distillation on a student RNN by using a teacher RNN.

In a possible implementation, the target RNN is obtained by performing knowledge distillation on the student RNN by using the teacher RNN and based on a first target loss, and the first target loss indicates a difference between a first output and a second output.

The first output is an output of an output layer of the teacher RNN, and the second output is an output of an output layer of the student RNN.

Alternatively, the first output is an output of an intermediate layer of the teacher RNN, and the second output is an output of an intermediate layer of the student RNN.

In a possible implementation, the performing feature extraction on the first phoneme and the second phoneme includes:
 processing the first phoneme and the second phoneme by using a target feature extraction network, to obtain the first audio feature of the first phoneme and the second audio feature of the second phoneme, where the target feature extraction network is obtained by performing knowledge distillation on a student feature extraction network by using a teacher feature extraction network and based on a second target loss, and the second target loss indicates a difference between a third output and a fourth output.

The third output is an output of an output layer of the teacher feature extraction network, and the fourth output is an output of an output layer of the student feature extraction network.

Alternatively, the third output is an output of an intermediate layer of the teacher feature extraction network, and the fourth output is an output of an intermediate layer of the student feature extraction network.

According to a second aspect, this application provides a text data processing apparatus, including:
 an obtaining module, configured to obtain target text, where a phoneme of the target text includes a first phoneme and a second phoneme that are adjacent to each other;

a feature extraction module, configured to perform feature extraction on the first phoneme and the second phoneme to obtain a first audio feature of the first phoneme and a second audio feature of the second phoneme;

a speech data extraction module, configured to: obtain, by using a target recurrent neural network RNN and based on the first audio feature, first speech data corresponding to the first phoneme, and obtain, by using the target RNN and based on the second audio feature, second speech data corresponding to the second phoneme, where a step of obtaining the first speech data corresponding to the first phoneme and a step of obtaining the second speech data corresponding to the second phoneme are concurrently performed; and an audio extraction module, configured to obtain, by using a vocoder and based on the first speech data and the second speech data, audio corresponding to the first phoneme and audio corresponding to the second phoneme.

In a possible implementation, the target RNN includes a hidden layer and an output layer. The speech data extraction module is configured to: determine, by using the hidden layer, an output of a first hidden layer based on the first audio feature, determine, by using the output layer, the first speech data based on the output of the first hidden layer, determine, by using the hidden layer, an output of a second hidden layer based on the second audio feature, and determine, by using the output layer, the second speech data based on the output of the second hidden layer, where the output of the first hidden layer is not used as an input of the hidden layer when the hidden layer determines the output of the second hidden layer.

In a possible implementation, duration of the first phoneme is N frames, a quantity of first audio features is N, each of the N first audio features corresponds to one of the N frames, the N first audio features include a first target audio feature and a third target audio feature, a frame corresponding to the first target audio feature is an adjacent frame before a frame corresponding to the third target audio feature, and the first speech data includes first speech sub-data corresponding to the first target audio feature and third speech sub-data corresponding to the third target audio feature.

The speech data extraction module is configured to:
determine, by using the hidden layer, an output of a third hidden sub-layer based on the third target audio feature,
determine, by using the hidden layer, an output of a first hidden sub-layer based on the first target audio feature and the output of the third hidden sub-layer,
determine, by using the output layer, the third speech sub-data based on the output of the third hidden sub-layer, and
determine, by using the output layer, the first speech sub-data based on the output of the first hidden sub-layer.

In a possible implementation, the first audio feature includes at least one of the following information: fundamental frequency information or energy information of the first phoneme, and the second audio feature includes at least one of the following information: fundamental frequency information or energy information of the second phoneme.

In a possible implementation, the first speech data and the second speech data each are a mel spectrogram MEL or a bark spectrogram Bark.

In a possible implementation, the target RNN is obtained by performing knowledge distillation on a student RNN by using a teacher RNN.

In a possible implementation, the target RNN is obtained by performing knowledge distillation on the student RNN by using the teacher RNN and based on a first target loss, and the first target loss indicates a difference between a first output and a second output.

The first output is an output of an output layer of the teacher RNN, and the second output is an output of an output layer of the student RNN.

Alternatively, the first output is an output of an intermediate layer of the teacher RNN, and the second output is an output of an intermediate layer of the student RNN.

In a possible implementation, the feature extraction module is configured to: process the first phoneme and the second phoneme by using a target feature extraction network, to obtain the first audio feature of the first phoneme and the second audio feature of the second phoneme, where the target feature extraction network is obtained by performing knowledge distillation on a student feature extraction network by using a teacher feature extraction network and based on a second target loss, and the second target loss indicates a difference between a third output and a fourth output.

The third output is an output of an output layer of the teacher feature extraction network, and the fourth output is an output of an output layer of the student feature extraction network.

Alternatively, the third output is an output of an intermediate layer of the teacher feature extraction network, and the fourth output is an output of an intermediate layer of the student feature extraction network.

According to a third aspect, this application provides a text data processing apparatus, including a processor. The processor is coupled to a memory. The memory stores program instructions, and when the program instructions stored in the memory are executed by the processor, the method in the first aspect is implemented. For steps performed by the processor in the possible implementations of the first aspect, refer to the first aspect. Details are not described herein again.

According to a fourth aspect, this application provides a computer-readable storage medium. The computer-readable storage medium stores a computer program, and when the computer program is run on a computer, the computer is enabled to perform the method in the first aspect.

According to a fifth aspect, this application provides a circuit system. The circuit system includes a processing circuit, and the processing circuit is configured to perform the method in the first aspect.

According to a sixth aspect, this application further provides a computer program product. The computer program product includes code. When the code is run on a computer, the computer is enabled to perform the method in the first aspect.

According to a seventh aspect, this application provides a chip system. The chip system includes a processor, configured to implement functions in the foregoing aspects, for example, sending or processing data and/or information in the foregoing methods. In a possible design, the chip system further includes a memory. The memory is configured to store program instructions and data that are necessary for a server or a communication device. The chip system may include a chip, or may include a chip and another discrete component.

Embodiments of this application provide a text data processing method. The method includes: obtaining target text, where a phoneme of the target text includes a first phoneme and a second phoneme that are adjacent to each other; performing feature extraction on the first phoneme and the second phoneme, to obtain a first audio feature of the first phoneme and a second audio feature of the second phoneme; obtaining, by using a target recurrent neural network RNN and based on the first audio feature, first speech data corresponding to the first phoneme, and obtaining, by using the target RNN and based on the second audio feature, second speech data corresponding to the second phoneme, where the step of obtaining the first speech data corresponding to the first phoneme and the step of obtaining the second speech data corresponding to the second phoneme are concurrently performed; and obtaining, by using a vocoder and based on the first speech data and the second speech data, audio corresponding to the first phoneme and audio corresponding to the second phoneme. In this way, the target RNN can concurrently process the first audio feature and the second audio feature. This decouples a processing process of the first audio feature and a processing process of the second audio feature, and reduces duration for processing the audio feature by the target RNN.

DESCRIPTION OF EMBODIMENTS

The following describes embodiments of the present invention with reference to the accompanying drawings in embodiments of the present invention. Terms used in embodiments of the present invention are merely intended to explain specific embodiments of the present invention, and are not intended to limit the present invention.

The following describes embodiments of this application with reference to the accompanying drawings. A person of ordinary skill in the art may learn that, with development of technologies and emergence of a new scenario, the technical solutions provided in embodiments of this application are also applicable to a similar technical problem.

In this specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, which is merely a distinguishing manner that is used when objects having a same attribute are described in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

It should be understood that in this application, "at least one piece (item)" means one or more and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one item (piece) of the following" or a similar expression thereof means any combination of these items, including a singular item (piece) or any combination of plural items (pieces). For example, at least one item (piece) of a, b, or c may indicate: a, b, c, "a and b", "a and c", "b and c", or "a, b, and c", where a, b, and c may be singular or plural.

Figure 1:
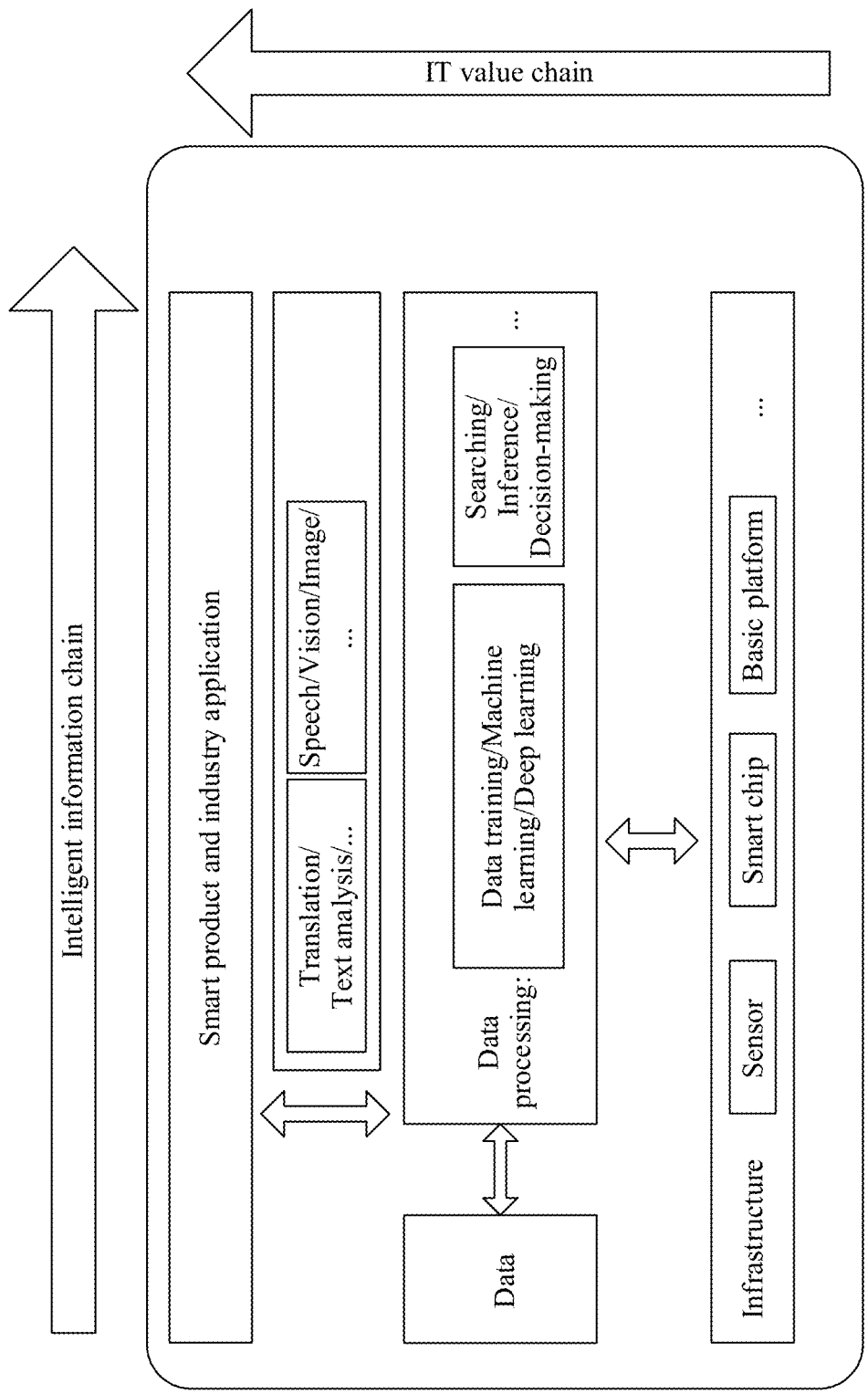
FIG. 1 is a schematic diagram of a structure of an artificial intelligence main framework.

An overall working procedure of an artificial intelligence system is first described with reference to FIG. 1. FIG. 1 is a schematic diagram of a structure of an artificial intelligence main framework. The following describes the artificial intelligence main framework from two dimensions: an "intelligent information chain" (a horizontal axis) and an "IT value chain" (a vertical axis). The "intelligent information chain" reflects a series of process from obtaining data to processing the data. For example, the process may be a general process of intelligent information perception, intelligent information representation and formation, intelligent inference, intelligent decision-making, and intelligent execution and output. In this process, the data undergoes a refinement process of "data-information-knowledge-intelligence". The "IT value chain" from an underlying infrastructure and information (which provides and processes technology implementations) of artificial intelligence to an industrial ecology process of the system reflects values brought by artificial intelligence to the information technology industry.

(1) Infrastructure

The infrastructure provides computing capability support for an artificial intelligence system, implements communication with the external world, and implements support by using a basic platform. The infrastructure communicates with the outside by using a sensor. A computing capability is provided by a smart chip (a hardware acceleration chip such as a CPU, an NPU, a GPU, an ASIC, or an FPGA). The basic platform includes related platform assurance and support such as a distributed computing framework and a network, and may include cloud storage and computing, and an interconnection and interworking network, and the like. For example, the sensor communicates with the outside to obtain data, and the data is provided to a smart chip for computing, where the smart chip is in a distributed computing system provided by the basic platform.

(2) Data

Data at an upper layer of an infrastructure indicates a data source in the field of artificial intelligence. The data relates to a graph, an image, speech, and text, and further relates to internet of things data of a conventional device. The internet of things data of the conventional device includes service data of an existing system, and perception data such as force, displacement, a liquid level, a temperature, and humidity.

(3) Data Processing

Data processing usually includes a manner such as data training, machine learning, deep learning, searching, inference, or decision-making.

Machine learning and deep learning may be used to perform symbolic and formal intelligent information modeling, extraction, preprocessing, training, and the like on data.

Inference is a process in which a human intelligent inference manner is simulated in a computer or an intelligent system, and machine thinking and problem resolving are performed based on formal information according to an inference control policy. A typical function is searching and matching.

Decision-making is a process in which a decision is made after intelligent information is inferred, and usually provides functions such as classification, ranking, and prediction.

(4) General Capability

After data processing mentioned above is performed on data, some general capabilities may further be formed based on a data processing result. For example, the general capabilities may be an algorithm or a general system for, for example, translation, text analysis, computer vision processing, speech recognition, and image recognition.

(5) Smart Product and Industry Application

The smart product and the industry application are a product and an application of an artificial intelligence system in various fields, and are package of an overall solution of artificial intelligence, so that decision-making for intelligent information is productized and an application is implemented. Application fields mainly include a smart terminal, smart transportation, smart health care, autonomous driving, a safe city, and the like.

Figure 2:
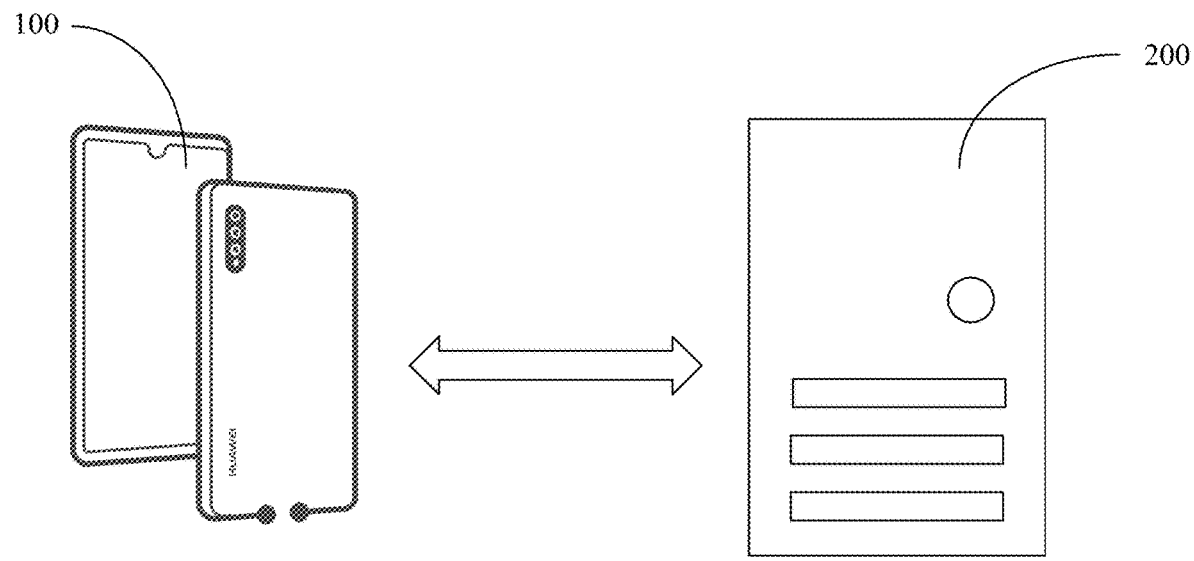
FIG. 2 shows a natural language processing system.

FIG. 2 is a schematic diagram of an example structure of a communication system. As shown in FIG. 2, the communication system includes a server 200 and an electronic device 100. Optionally, the communication system may include one or more servers, and one or more electronic devices may be included in a coverage area of each server. This is not limited in this application. Optionally, the communication system may further include another network entity such as a network controller and a switching device. This application is not limited thereto. A bidirectional arrow in FIG. 2 indicates that there is a communication connection between the server and the electronic device. To be specific, data transmission may be implemented between the server and the electronic device through a communication network.

It should be noted that the communication network may be a local area network, or may be a wide area network transferred by using a relay (relay) device, or may include a local area network and a wide area network. For example, when the communication network is a local area network, the communication network may be a short-range communication network such as a Wi-Fi hotspot network, a Wi-Fi P2P network, a Bluetooth network, a ZigBee network, or a near field communication (near field communication, NFC) network. For example, when the communication network is a wide area network, the communication network may be a 3rd-generation mobile communication technology (3rd-generation wireless telephone technology, 3G) network, a 4th-generation mobile communication technology (the 4th-generation mobile communication technology, 4G) network, a 5th-generation mobile communication technology (5th-generation mobile communication technology, 5G) network, a future evolved public land mobile network (public land mobile network, PLMN), or the internet. This is not limited in this embodiment of this application.

In an implementation, the electronic device may obtain target text input by a user, the electronic device may send the target text to a server side, the server may generate, based on the target text, audio corresponding to the target text, and the server may send the audio to the electronic device.

In another implementation, the electronic device may obtain target text input by a user, and generate, based on the target text, audio corresponding to the target text.

Figure 3A:
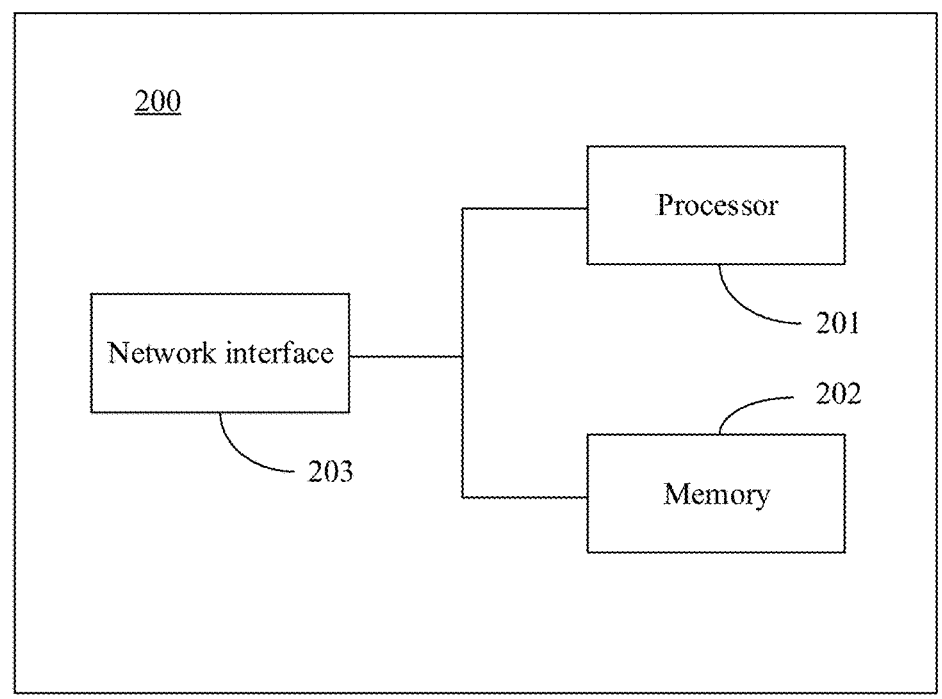
FIG. 3a is a schematic diagram of a server according to an embodiment of this application.

It should be understood that, for ease of understanding, FIG. 2 schematically shows only one communication system, but this should not constitute any limitation on this application. The communication system may further include more servers, or may include more electronic devices. Servers that communicate with different electronic devices may be a same server or may be different servers. Quantities of servers that communicate with different electronic devices may be the same or may be different. This is not limited in this application. It should be further understood that the server in the communication system may be any device that has a transceiver function or a chip that can be disposed in the device. FIG. 3a is a schematic diagram of an example structure of the server 200. For a structure of the server 200, refer to the structure shown in FIG. 3a.

The server includes at least one processor 201, at least one memory 202, and at least one network interface 203. The processor 201, the memory 202, and the network interface 203 are connected, for example, through a bus. In this application, the connection may include various types of interfaces, transmission lines, buses, or the like. This is not limited in this embodiment. The network interface 203 is configured to enable the server to be connected to another communication device such as an Ethernet interface through a communication link.

The processor 201 is mainly configured to: process communication data, control the entire server, execute a software program, and process data of the software program, for example, configured to support the server in performing actions described in embodiments. The processor 201 is mainly configured to control the entire server, execute the software program, and process the data of the software program. A person skilled in the art may understand that the server may include a plurality of processors to enhance a processing capability of the server, and components of the server may be connected through various buses. The processor 201 may also be expressed as a processing circuit or a processor chip.

The memory 202 is mainly configured to store the software program and data. The memory 202 may exist independently, or may be connected to the processor 201. Optionally, the memory 202 and the processor 201 may be integrated, for example, integrated into a chip. The memory 202 can store program code for executing the technical solutions of this application, and the processor 201 controls execution of the program code. Various types of executed computer program code may also be considered as drivers of the processor 201.

FIG. 3*a* shows only one memory and one processor. In an actual server, there may be a plurality of processors and a plurality of memories. The memory may also be referred to as a storage medium, a storage device, or the like. The memory may be a storage element located on a same chip as the processor, that is, an on-chip storage element, or an independent storage element. This is not limited in this application.

It should be further understood that the electronic device in the communication system may also be referred to as user equipment (user equipment, UE). The electronic device may be deployed on land, including an indoor or outdoor device, a handheld device, or a vehicle-mounted device, or may be deployed on the water (for example, on a ship), or may be deployed in the air (for example, on an airplane, a balloon, or a satellite). The electronic device may be a mobile phone (mobile phone), a pad (pad), a wearable device (such as a smartwatch) having a wireless communication function, a location tracker having a positioning function, a computer having a wireless transceiver function, a virtual reality (virtual reality, VR) device, an augmented reality (augmented reality, AR) device, a wireless device in a smart home (smart home), or the like. This is not limited in this application. In this application, the foregoing electronic device and a chip that can be disposed in the foregoing electronic device are collectively referred to as an electronic device.

The electronic device in this application may include but is not limited to a smart mobile phone, a television, a pad, a wristband, a head mount display (Head Mount Display, HMID) device, an augmented reality (augmented reality, AR) device, a mixed reality (mixed reality, MR) device, a cellular phone (cellular phone), a smartphone (smartphone), a personal digital assistant (personal digital assistant, PDA), a tablet computer, a vehicle-mounted electronic device, a laptop computer (laptop computer), a personal computer (personal computer, PC), a monitoring device, a robot, a vehicle-mounted terminal, an autonomous vehicle, and the like. Certainly, in the following embodiments, a specific form of the electronic device is not limited.

Figure 3B:
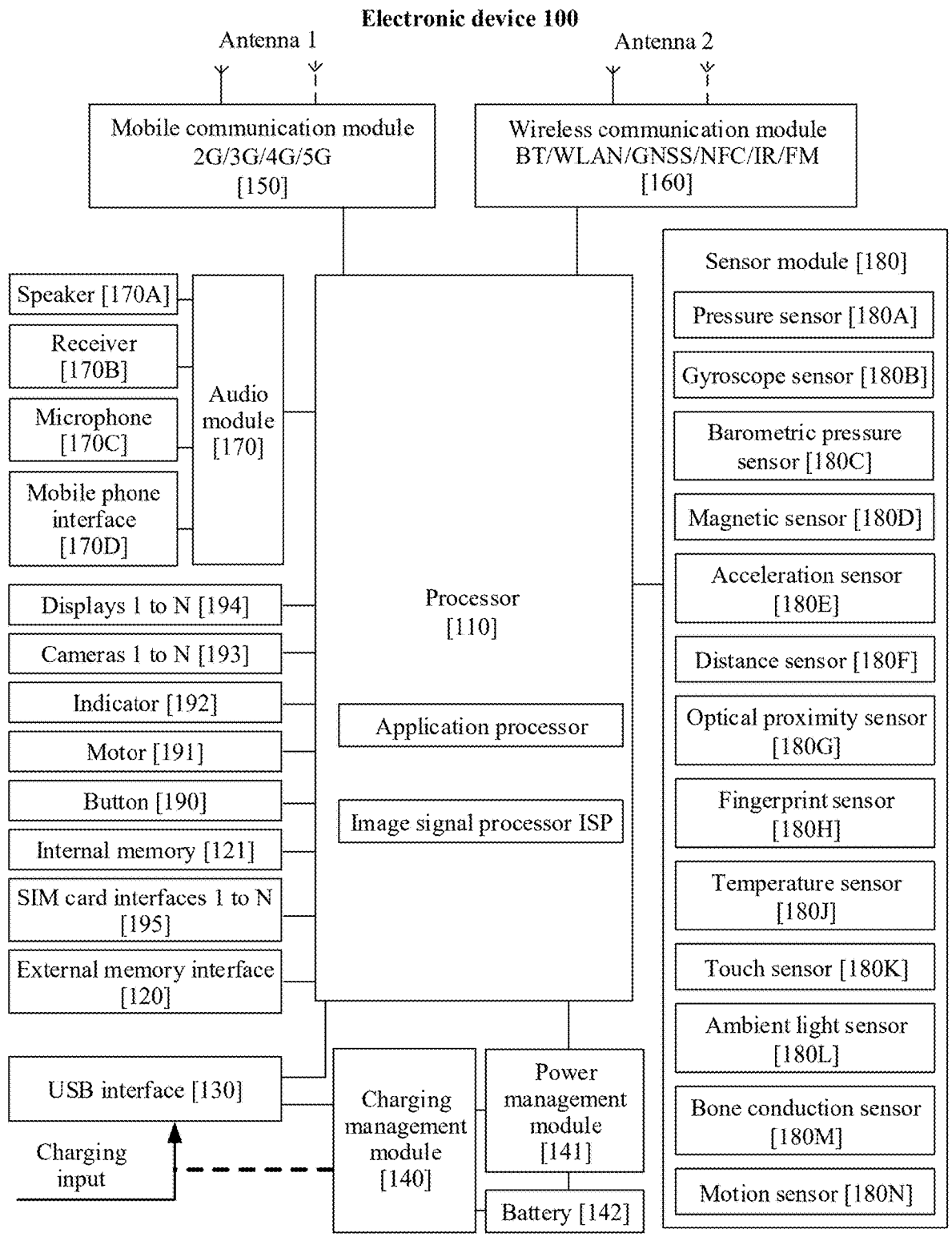
FIG. 3b is a schematic diagram of an electronic device according to an embodiment of this application.

For example, refer to FIG. 3*b*. The following uses a specific structure as an example to describe a structure of the electronic device provided in this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, a motion sensor 180N, and the like.

It may be understood that the structure shown in this embodiment of this present invention does not constitute a specific limitation on the electronic device 100. In other embodiments of this application, the electronic device 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instruction or the data again, the processor may directly invoke the instruction or the data from the memory. This avoids repeated access, and reduces waiting time of the processor 110, to improve system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may also be used for audio communication, and samples, quantizes, and encodes an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call by using a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset, to play audio by using the headset. The interface may be further configured to connect to another electronic device such as an AR device.

It may be understood that an interface connection relationship between the modules that is shown in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input by using a wireless charging coil of the electronic device 100. The charging management module 140 supplies power to the electronic device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, an antenna may be used in combination with a tuning switch.

The mobile communication module 150 may provide a solution that is applied to the electronic device 100 and that includes wireless communication such as 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 and at least some modules of the processor 110 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like, or displays an image or a video on the display 194. In some embodiments, the modem processor may be an independent component. In some other embodiments, the modem processor may be independent of the processor 110, and disposed in a same component as the mobile communication module 150 or another functional module.

The wireless communication module 160 may provide a wireless communication solution that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC) technology, an infrared (infrared, IR) technology, or the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include but is not limited to a 5th generation mobile communication technology (5th Generation, 5G) system, a global system for mobile communication (global system for mobile communication, GSM), a general packet radio service (general packet radio service, GPRS), code division multiple access (code division multiple access, CDMA), wideband code division multiple access (wideband code division multiple access, WCDMA), time division code division multiple access (time-division code division multiple access, TD-SCDMA), long term evolution (long term evolution, LTE), Bluetooth (Bluetooth), a global navigation satellite system (global navigation satellite system, GNSS), wireless fidelity (wireless fidelity, Wi-Fi), near field communication (near field communication, NFC), FM (also referred to as frequency modulation broadcasting), a ZigBee (ZigBee) protocol, a radio frequency identification (radio frequency identification, RFID) technology, an infrared (infrared, IR) technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), a satellite-based augmentation system (satellite-based augmentation system, SBAS), and/or the like.

In some implementations, the electronic device 100 may alternatively include a wired communication module (not shown in FIG. 1), or the mobile communication module 150 or the wireless communication module 160 herein may be replaced with a wired communication module (not shown in FIG. 1). The wired communication module may enable the electronic device to communicate with another device by using a wired network. The wired network may include but is not limited to one or more of the following: an optical transport network (optical transport network, OTN), a synchronous digital hierarchy (synchronous digital hierarchy, SDH), a passive optical network (passive optical network, PON), the Ethernet (Ethernet), the flexible Ethernet (flex Ethernet, FlexE), or the like.

The electronic device 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV In some embodiments, the electronic device 100 may include one or N cameras 193, where N is a positive integer greater than 1.

The digital signal processor is configured to process a digital signal, and may process another digital signal in addition to a digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the electronic device 100 may be implemented by using the NPU, for example, image recognition, facial recognition, speech recognition, and text understanding.

The external memory interface 120 may be used to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (such as audio data and a phone book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS). The processor 110 runs instructions stored in the internal memory 121 and/or instructions stored in the memory disposed in the processor, to perform various function applications and data processing of the electronic device 100.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunication industry association of the USA (cellular telecommunication industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The electronic device 100 determines pressure intensity based on the change in the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed in a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to a first pressure threshold is performed on an SMS message application icon, an instruction for creating a new SMS message is executed. The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may also be used in a navigation scenario and a somatic game scenario. The barometric pressure sensor 180C is configured to measure barometric pressure. In some embodiments, the electronic device 100 calculates an altitude based on the barometric pressure measured by the barometric pressure sensor 180C, to assist in positioning and navigation. The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover. The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer. The distance sensor 180F is configured to measure a distance. The electronic device 100 may measure the distance in an infrared manner or a laser manner. In some embodiments, in a photographing scenario, the electronic device 100 may measure a distance by using the distance sensor 180F to implement quick focusing. The optical proximity sensor 180G may include, for example, a light-emitting diode (LED) and an optical detector, for example, a photodiode. The light emitting diode may be an infrared light emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, so that automatic screen-off is implemented to save power. The optical proximity sensor 180G may also be used in a leather case mode or a pocket mode to automatically perform screen unlocking or locking. The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch. The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like. The temperature sensor 180J is configured to detect a temperature. The touch sensor 180K is also referred to as a "touch control component". The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 at a location different from that of the display 194. The bone conduction sensor 180M may obtain a vibration signal.

The motion sensor 180N may be configured to detect a moving object in a photographing range of the camera, and collect a moving contour or a moving track of the moving object. For example, the motion sensor 180N may be an infrared sensor, a laser sensor, a dynamic vision sensor (dynamic vision sensor, DVS), or the like. The DVS may specifically include a sensor such as a DAVIS (Dynamic and Active-pixel Vision Sensor), an ATIS (Asynchronous Time-based Image Sensor), or a CeleX sensor. The DVS draws on a characteristic of biological vision. Each pixel simulates a neuron and responds independently to a relative change in light intensity (hereinafter referred to as "light intensity"). When the relative change of light intensity exceeds a threshold, the pixel outputs an event signal, including a pixel location, a time stamp, and light intensity characteristic information.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

The electronic device 300 may be logically divided into a hardware layer, an operating system 311, and an application layer. The hardware layer includes hardware resources such as the application processor 301, the MCU 302, the memory 303, the modem 304, the Wi-Fi module 306, the sensor 308, and the positioning module 310. A type of the operating system carried on the electronic device 300 is not limited in this application.

Embodiments of this application relate to applications of a large quantity of neural networks. Therefore, for ease of understanding, the following first describes terms and concepts related to the neural network in embodiments of this application.

(1) Neural Network

The neural network may include a neuron. The neuron may be an operation unit that uses xs and an intercept of 1 as an input. An output of the operation unit may be as follows:

$$h_{W,b}(x)=f(W^T x)=f(\Sigma_{s=1}^n W_s x_s+b) \quad (1\text{-}1)$$

s=1, 2, . . . , or n, n is a natural number greater than 1, Ws is a weight of xs, and b is bias of the neuron. f is an activation function (activation function) of the neuron, which is used to introduce a nonlinear feature into the neural network, to convert an input signal in the neuron into an output signal. The output signal of the activation function may be used as an input of a next convolutional layer. The activation function may be a sigmoid function. The neural network is a network formed by connecting a plurality of single neurons together. To be specific, an output of a neuron may be an input of another neuron. An input of each neuron may be connected to a local receptive field of a previous layer to extract a feature of the local receptive field. The local receptive field may be a region including several neurons.

Work at each layer of the neural network may be described by using a mathematical expression $\vec{y}=a(W\vec{x}+b)$. From a physical layer, work at each layer of the neural network may be understood as completing transformation from input space to output space (namely, from row space to column space of a matrix) by performing five operations on the input space (a set of input vectors). The five operations are as follows: 1. dimension increasing/dimension reduction; 2. scaling up/scaling down; 3. rotation; 4. translation; and 5. "bending". The operation 1, the operation 2, and the operation 3 are performed by $W\vec{x}$, the operation 4 is performed by +b, and the operation 5 is performed by a( ). The word "space" is used herein for expression because a classified object is not a single thing, but a type of things. Space is a collection of all individuals of such type of things. W is a weight vector, and each value in the vector indicates a weight value of one neuron in the neural network at this layer. The vector W determines space transformation from the input space to the output space described above. In other words, a weight W at each layer controls how to transform space. The neural network is trained to finally obtain a weight matrix (a weight matrix including vectors W at a plurality of layers) of all layers of the trained neural network. Therefore, the training process of the neural network is essentially a manner of learning control of space transformation, and more specifically, learning a weight matrix.

Because it is expected that an output of the neural network is as close as possible to a predicted value that is actually expected, a current predicted value of the network may be compared with a target value that is actually expected, and then a weight vector of each layer of the neural network is updated based on a difference between the current predicted value and the target value (certainly, there is usually an initialization process before the first updating, to be specific, parameters are preconfigured for all layers of the neural network). For example, if the predicted value of the network is large, the weight vector is adjusted to decrease the predicted value, and adjustment is continuously performed, until the neural network can predict the target value that is actually expected. Therefore, "how to obtain, through comparison, a difference between the predicted value and the target value" needs to be predefined. This is a loss function (loss function) or an objective function (objective function). The loss function and the objective function are important equations that measure the difference between the predicted value and the target value. The loss function is used as an example. A larger output value (loss) of the loss function indicates a larger difference. Therefore, training of the neural network is a process of minimizing the loss as much as possible.

(2) Deep Neural Network

The deep neural network (Deep Neural Network, DNN), also referred to as a multi-layer neural network, may be understood as a neural network having many hidden layers. The "many" herein does not have a special measurement standard. The DNN is divided based on locations of different layers, and a neural network in the DNN may be divided into three types: an input layer, a hidden layer, and an output layer. Generally, the first layer is the input layer, the last layer is the output layer, and the middle layer is the hidden layer. Layers are fully connected. To be specific, any neuron at an $i^{th}$ layer is necessarily connected to any neuron at an $(i+1)^{th}$ layer. Although the DNN seems complex, it is not complex in terms of work at each layer. Simply speaking, the DNN is shown in the following linear relationship expression: $\vec{y}=a(W\vec{x}+\vec{b})$, where $\vec{x}$ is an input vector, $\vec{y}$ is an output vector, $\vec{b}$ is a bias vector, W is a weight matrix (also referred to as a coefficient), and a( ) is an activation function. At each layer, only such a simple operation is performed on the input vector $\vec{x}$ to obtain the output vector $\vec{y}$. Because the DNN includes a large quantity of layers, there are a large quantity of coefficients W and a large quantity of bias vectors $\vec{b}$. Definitions of these parameters in the DNN are as follows: The coefficient W is used as an example. It is assumed that in a three-layer DNN, a linear coefficient from a fourth neuron at a second layer to a second neuron at a third layer is defined as $w_{24}^3$. The superscript 3 represents the layer at which the coefficient W is located, and the subscript corresponds to the output third-layer index 2 and the input second-layer index 4. In conclusion, a coefficient of a $k^{th}$ neuron at an $(L-1)^{th}$ layer to a $j^{th}$ neuron at an $L^{th}$ layer is defined as $W_{jk}^L$. It should be noted that there is no parameter W at the input layer. In the deep neural network, more hidden layers make the network more capable of describing a complex case in the real world. Theoretically, a model with more parameters has higher complexity and a larger "capacity". It indicates that the model can complete a more complex learning task. Training the deep neural network is a process of learning a weight matrix, and a final objective of the training is to obtain a weight matrix of all layers of the trained deep neural network (a weight matrix formed by vectors W at many layers).

(3) Convolutional Neural Network

The convolutional neural network (CNN, Convolutional Neuron Network) is a deep neural network having a convolutional structure. The convolutional neural network includes a feature extractor including a convolutional layer and a sampling sub-layer. The feature extractor may be considered as a filter. A convolution process may be considered as performing convolution by using a trainable filter and an input image or a convolution feature plane (feature map). The convolutional layer is a neuron layer that is in the convolutional neural network and at which convolution processing is performed on an input signal. At the convolutional layer of the convolutional neural network, one neuron may be connected only to some adjacent-layer neurons. One convolutional layer usually includes a plurality of feature planes, and each feature plane may include some neurons that are in a rectangular arrangement. Neurons at a same feature plane share a weight, and the weight shared herein is a convolution kernel. Weight sharing may be understood as that an image information extraction manner is irrelevant to a location. A principle implied herein is that statistical information of a part of an image is the same as that of other parts. This means that image information learned in a part can also be used in another part. Therefore, the same image information obtained through learning can be used for all locations on the image. At a same convolutional layer, a plurality of convolution kernels may be used to extract different image information. Usually, a larger quantity of convolution kernels indicates richer image information reflected in a convolution operation.

The convolution kernel may be initialized in a form of a matrix of a random size. In a training process of the convolutional neural network, the convolution kernel may obtain a proper weight through learning. In addition, benefits directly brought by weight sharing are that connections between layers of the convolutional neural network are reduced, and an overfitting risk is reduced.

(4) A recurrent neural network (RNN, Recurrent Neural Network) is used to process sequence data. A conventional neural network model starts from an input layer to a hidden layer and then to an output layer, and the layers are fully connected, while nodes in each layer are unconnected. Although this ordinary neural network resolves many problems, it is still incompetent to many problems. For example, if a word in a sentence is to be predicted, a previous word usually needs to be used, because adjacent words in the sentence are related. A reason why the RNN is referred to as the recurrent neural network is that a current output of a sequence is also related to a previous output of the sequence. A specific representation form is that the network memorizes previous information and applies the previous information to calculation of the current output. To be specific, nodes at the hidden layer are connected, and an input of the hidden layer not only includes an output of the input layer, but also includes an output of the hidden layer at a previous moment. Theoretically, the RNN can process sequence data of any length. Training for the RNN is the same as training for a conventional CNN or DNN. An error back propagation algorithm is also used, but there is a difference: If the RNN is expanded, a parameter such as W of the RNN is shared. This is different from the conventional neural network described in the foregoing example. In addition, during use of a gradient descent algorithm, an output in each step depends not only on a network in a current step, but also on a network status in several previous steps. The learning algorithm is referred to as a back propagation through time (Back propagation Through Time, BPTT) algorithm.

Why is the recurrent neural network still required when the convolutional neural network is available? A reason is simple. In the convolutional neural network, it is assumed that elements are independent of each other, and an input and an output are also independent, such as a cat and a dog. However, in the real world, a plurality of elements are interconnected. For example, the stock changes with time. For another example, a person says "I like traveling, and the most favorite place is Yunnan. In the future, when there is a chance, I will go to ( ). Herein, people should know that the person will go to "Yunnan". Because people perform inference from the context. However, how do machines do that? Then, the RNN emerges. The RNN is intended to make the machine capable of memorizing like a human. Therefore, an output of the RNN needs to depend on current input information and historical memorized information.

(5) Loss Function

In a process of training a deep neural network, because it is expected that an output of the deep neural network is as close as possible to a predicted value that is actually expected, a predicted value of a current network may be compared with a target value that is actually expected, and then a weight vector of each layer of the neural network is updated based on a difference between the predicted value and the target value (certainly, there is usually an initialization process before the first updating, to be specific, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, a difference between the predicted value and the target value" needs to be predefined. This is a loss function (loss function) or an objective function (objective function). The loss function and the objective function are important equations that measure the difference between the predicted value and the target value. The loss function is used as an example. A larger output value (loss) of the loss function indicates a larger difference. Therefore, training of the deep neural network is a process of minimizing the loss as much as possible.

(6) Back Propagation Algorithm

A convolutional neural network may correct a value of a parameter in an initial super-resolution model in a training process according to an error back propagation (back propagation, BP) algorithm, so that a reconstruction error loss of the super-resolution model becomes smaller. Specifically, an input signal is transferred forward until an error loss occurs at an output, and the parameter in the initial super-resolution model is updated based on back propagation error loss information, to make the error loss converge. The back propagation algorithm is an error-loss-centered back propagation motion intended to obtain an optimal parameter, for example, a weight matrix, of the super-resolution model.

(7) Fundamental Frequency (Fundamental Frequency)

When a vocal body makes a sound due to vibration, the sound may be generally divided into a plurality of simple sine waves. In other words, all natural sounds are basically formed by a plurality of sine waves with different frequencies, a sine wave with a lowest frequency is a pitch (that is, the fundamental frequency, represented by F0), and other sine waves with higher frequencies are overtones.

(8) Energy (Energy)

The energy is also referred to as an intensity or a volume, may represent a volume of a sound, and may be simulated by using an amplitude of a sound signal. A larger amplitude indicates a higher volume of a sound waveform.

(9) Prosody (Prosody)

In the speech synthesis field, the prosody generally refers to features of functions that control a tone, a pitch, accent emphasis, a pause, and a rhythm. The prosody can reflect an emotional state, a speaking form, and the like of a speaker.

(10) Vocoder (Vocoder)

The vocoder is a sound signal processing module or software that can encode an acoustic feature into a sound waveform.

The following describes a method provided in this application from a neural network training side and a neural network application side.

A neural network training method provided in embodiments of this application relates to processing of natural language data, and may be specifically applied to data processing methods such as data training, machine learning, and deep learning. Symbolized and formalized intelligent information modeling, extraction, preprocessing, training, and the like are performed on training data, to finally obtain a trained text processing model (including a feature extraction model and a recurrent neural network RNN). In addition, in a text data processing method provided in embodiments of this application, the trained text processing model may be used to input input data (for example, target text in this application) into the trained text processing model, to obtain output data (for example, audio in this application). It should be noted that the text processing model training method and the text processing method provided in embodiments of this application are inventions generated based on a same idea, or may be understood as two parts of a system or two phases of an entire process, for example, a model training phase and a model application phase.

Figure 4:
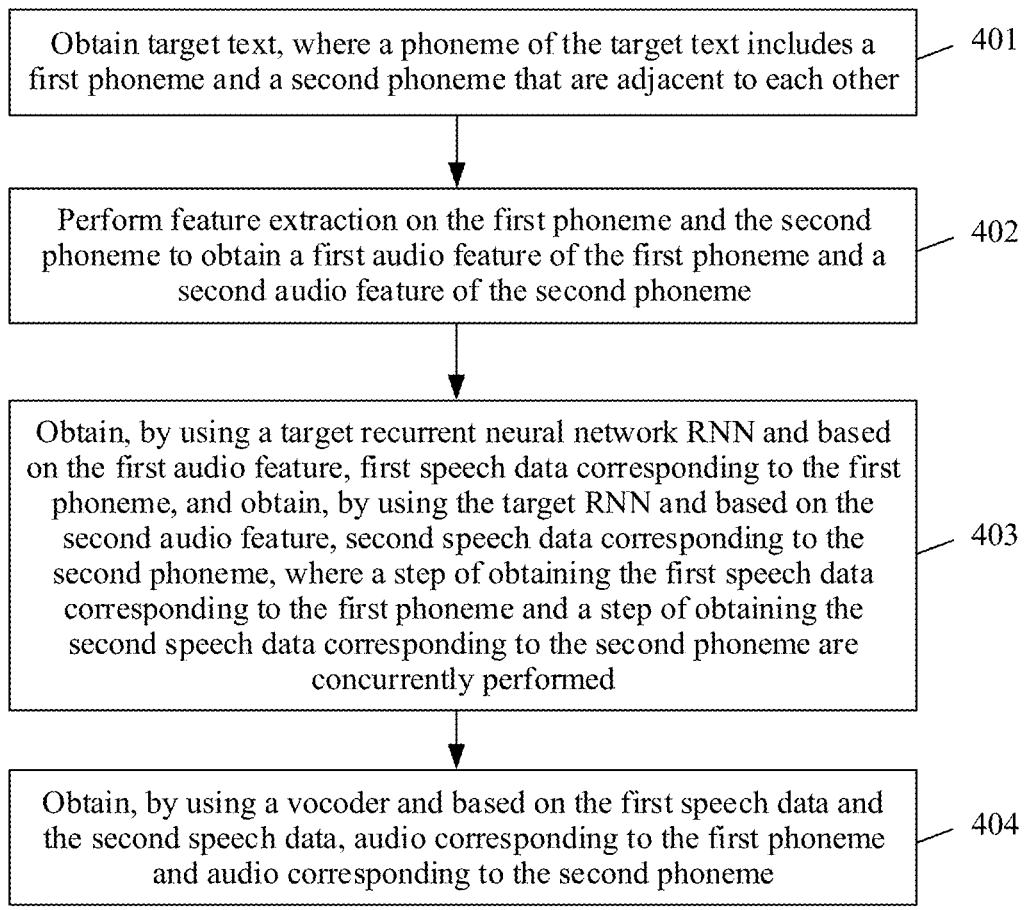
FIG. 4 is a schematic diagram of a text data processing method according to an embodiment of this application.

FIG. 4 shows the text data processing method according to an embodiment of this application. As shown in FIG. 4, the text data processing method provided in this embodiment includes the following steps.

401: Obtain target text, where a phoneme of the target text includes a first phoneme and a second phoneme that are adjacent to each other.

The step 401 may be performed by an electronic device. Specifically, a user may input, on the electronic device, target text on which audio conversion needs to be performed. Correspondingly, the electronic device may obtain the target text.

The step 401 may be performed by a server. Specifically, a user may input, on an electronic device, target text on which audio conversion needs to be performed, and the electronic device may send the target text to the server. Correspondingly, the server may obtain the target text.

In this embodiment of this application, the electronic device may display a text input box and a text input indication. The target indication indicates the user to input, into the text input box, the text on which audio conversion needs to be performed. The electronic device may obtain the target text input into the text input box by the user.

In a scenario, an application that can generate, based on the target text, audio corresponding to the target text may be installed on the electronic device. The user can start the related application, and input, into the application, the target text on which audio conversion needs to be performed, so that the electronic device can generate, based on the target text, the audio corresponding to the target text, or send the target text to the server, and the server generates, based on the target text, the audio corresponding to the target text.

In this embodiment of this application, after the target text is obtained, the target text may be processed by using a text to speech (text to speech, TTS) model, to obtain the audio corresponding to the target text.

In this embodiment of this application, after the target text is obtained, the target text may be preprocessed into a sequence adapted to an input format of the TTS model. For example, the server can perform text normalization on the target text to convert non-standard target text into a pronunciation format; perform word segmentation processing to segment a sentence in the target text in a unit of a word, to avoid sentence ambiguity; perform prosody analysis to predict a pause rhythm and/or an accent of each sentence in the target text; convert a word in the target text into a phoneme level, to obtain a phoneme string (namely, a phoneme of the target text); and convert the phoneme string into a sequence format (which may be referred to as an ID sequence in a subsequent embodiment) required by the TTS model.

It should be understood that a phoneme (phoneme) may also be referred to as a pronunciation phoneme, and is a minimum speech unit obtained through division based on a natural attribute of speech. It can be learned, from analysis based on a pronunciation action in a syllable, that one action forms one phoneme. Phonemes are classified into vowels and consonants. For example, a Chinese syllable a has only one phoneme, ai has two phonemes, and dai has three phonemes.

For example, target English text is "governments have made policy decisions", and phonemes of the target text are "G AH1 V ER0 M AH0 N T HH AE1 V M EY1 D P AA1 L AH0 S IY0 D IH0 S IH1 ZH AH0 N Z". For another example, phonemes of target Chinese text "Jin tian tian qi zen me yang (how is the weather today)" are "j", "in", "t", "i", "an", . . . .

In this embodiment of this application, the phoneme of the target text may include the first phoneme and the second phoneme that are adjacent to each other. The phoneme of the target text is a phoneme sequence in which a plurality of phonemes are arranged in a specific order, and the first phoneme and the second phoneme may be any two adjacent phonemes in the foregoing phoneme sequence.

Figure 5:
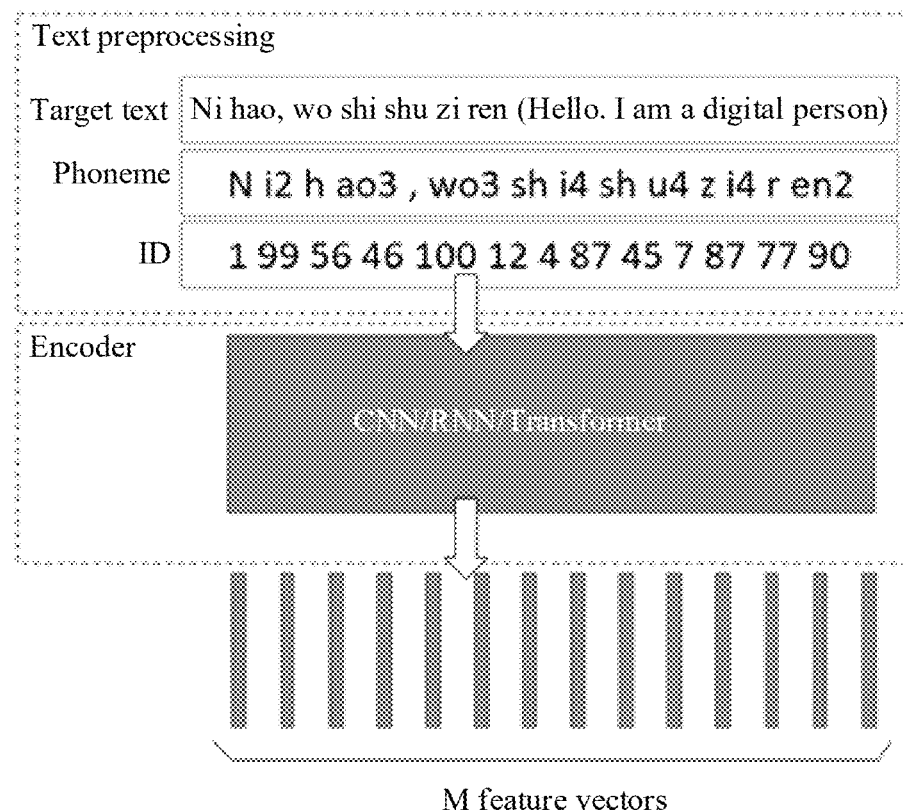
FIG. 5 is a schematic diagram of a text data processing method according to an embodiment of this application.

Specifically, M phonemes of the target text may be obtained, and the M phonemes are processed by using a neural network, to obtain M feature vectors. Refer to FIG. 5. The target text may be converted into a serialized identity ID (Identity) sequence, and each identifier in the ID sequence may correspond to one of the M phonemes. Correspondingly, the ID sequence includes two adjacent identifiers, and the two adjacent identifiers respectively correspond to the first phoneme and the second phoneme.

402: Perform feature extraction on the first phoneme and the second phoneme to obtain a first audio feature of the first phoneme and a second audio feature of the second phoneme.

The step 402 may be performed by the electronic device or the server.

Specifically, the electronic device may obtain the target text, and send the target text to the server. The server may perform feature extraction on the first phoneme and the second phoneme, to obtain the first audio feature of the first phoneme and the second audio feature of the second phoneme. Alternatively, the electronic device may obtain the target text, and perform feature extraction on the first phoneme and the second phoneme to obtain the first audio feature of the first phoneme and the second audio feature of the second phoneme. Alternatively, the server may obtain the target text, and perform feature extraction on the first phoneme and the second phoneme, to obtain the first audio feature of the first phoneme and the second audio feature of the second phoneme.

It should be understood that feature extraction may be performed on the phoneme of the target text to obtain a plurality of audio features. The plurality of audio features include the first audio feature of the first phoneme and the second audio feature of the second phoneme.

The following describes how to perform feature extraction on the first phoneme and the second phoneme to obtain the first audio feature of the first phoneme and the second audio feature of the second phoneme.

In this embodiment of this application, an encoder (for example, a network structure or a hybrid network structure, such as a convolutional neural network (convolutional neural network, CNN), a recurrent neural network (recurrent neural network, RNN), or a transformer shown in FIG. 5) can be used to perform feature extraction on the phoneme of the target text. For example, a serial structure of the encoder may include but is not limited to an LUP layer (a dimension of the LUP layer is 512), three filter layers, and a bidirectional circular neural network layer, where each filter layer includes 512 convolution kernels (kernel), a size of each convolution kernel is 5, the bidirectional circular neural network layer includes a hidden layer, and a dimension of the bidirectional circular neural network layer is 512. The encoder may be used to: convert the phoneme of the target text into a hidden layer representation sequence (which may also be referred to as a feature vector), in other words, map the phoneme of the target text to an intermediate implicit representation H, and generate a feature vector for each phoneme. These feature vectors include rich phoneme context information.

Specifically, the encoder may encode the ID sequence corresponding to the phoneme of the target text into the M feature vectors (or referred to as embedding vectors). The feature vector may include abstract content information of the phoneme of the target text.

After the encoder converts the phoneme of the target text into the feature vector, prosody prediction may be performed on the feature vector obtained by the encoder, to obtain an audio feature that may include richer features. The prosody prediction may include three parts: duration prediction, pitch prediction, and energy prediction, which respectively represent duration information, fundamental frequency information, and energy information of the phoneme. For example, three parts of energy prediction may be all implemented by using a same structure. For example, the structure may include two convolutional layers (384 3*1 convolution kernels) and a fully connected layer that includes a hidden layer and whose dimension is 384. In addition, a convolutional layer (512 9*1 convolution kernels) may be added for pitch prediction and energy prediction. In the duration prediction, the pitch prediction, and the energy prediction, H is used as an input to separately predict corresponding duration information D, fundamental frequency information F, and energy information E of each phoneme.

The duration information may be a quantity of frames corresponding to each phoneme. The quantity of frames corresponding to each phoneme is a quantity of frames in which each phoneme is presented. For example, the first phoneme is presented in N frames, and the second phoneme is presented in M frames. After the duration information is obtained, upsampling processing may be performed on the feature vector H, the fundamental frequency information F, and the energy information E of each phoneme, to obtain a feature vector H, fundamental frequency information F, and energy information E of each frame of each phoneme.

Then, an audio feature of each frame of each phoneme may be determined based on the feature vector H, the fundamental frequency information F, and the energy information H of each frame of each phoneme. For example, a sum of vectors of the feature vector H, the fundamental frequency information F, and the energy information H of each frame of each phoneme may be used as the audio feature of each frame of each phoneme, to obtain the first audio feature of the first phoneme and the second audio feature of the second phoneme.

It should be understood that the audio feature (including the first audio feature and the second audio feature) may be obtained based on at least one of the feature vector H, the fundamental frequency information F, and the energy information H of each frame. In addition, an obtaining manner is not limited to addition, for example, may be weight addition. Alternatively, the audio feature is obtained by using another mathematical operation or a neural network. This is not limited in this application.

In this embodiment of this application, the first audio feature of the first phoneme and the second audio feature of the second phoneme may be obtained. The first audio feature may include an audio feature of each frame corresponding to the first phoneme, and the second audio feature may include an audio feature of each frame corresponding to the second phoneme. Specifically, the first phoneme is used for presentation in N frames, a quantity of the first audio features is N, and each of the N first audio features corresponds to one of the N frames. The second phoneme is used for presentation in M frames, a quantity of second audio features is M, and each of the M second audio features corresponds to one of the M frames.

403: Obtain, by using a target recurrent neural network RNN and based on the first audio feature, first speech data corresponding to the first phoneme, and obtain, by using the target RNN and based on the second audio feature, second speech data corresponding to the second phoneme, where a step of obtaining the first speech data corresponding to the first phoneme and a step of obtaining the second speech data corresponding to the second phoneme are concurrently performed.

In this embodiment of this application, after the first audio feature of the first phoneme and the second audio feature of the second phoneme are obtained, the first speech data corresponding to the first phoneme and the second speech data corresponding to the second phoneme are concurrently determined by using the target recurrent neural network RNN and based on the first audio feature and the second audio feature.

The step 503 may be performed by the electronic device or the server. Specifically, the electronic device may obtain the target text, perform feature extraction on the first phoneme and the second phoneme to obtain the first audio feature of the first phoneme and the second audio feature of the second phoneme, and obtain, by using the target recurrent neural network RNN and based on the first audio feature and the second audio feature, the first speech data corresponding to the first phoneme and the second speech data corresponding to the second phoneme. Alternatively, the electronic device may obtain the target text, perform feature extraction on the first phoneme and the second phoneme to obtain the first audio feature of the first phoneme and the second audio feature of the second phoneme, and send the first audio feature of the first phoneme and the second audio feature of the second phoneme to the server, and the server may obtain, by using the target recurrent neural network RNN and based on the first audio feature and the second audio feature, the first speech data corresponding to the first phoneme and the second speech data corresponding to the second phoneme. Alternatively, the electronic device may obtain the target text, and send the target text to the server, and the server may perform feature extraction on the first phoneme and the second phoneme to obtain the first audio feature of the first phoneme and the second audio feature of the second phoneme, and obtain, by using the target recurrent neural network RNN and based on the first audio feature and the second audio feature, the first speech data corresponding to the first phoneme and the second speech data corresponding to the second phoneme.

In a possible implementation, the first speech data and the second speech data each are a mel spectrogram MEL or a bark spectrogram Bark.

In this embodiment of this application, the first audio feature of the first phoneme and the second audio feature of the second phoneme may be processed by using a pretrained RNN, to obtain the first speech data corresponding to the first phoneme and the second speech data corresponding to the second phoneme. Specifically, the phoneme of the target text may be processed by using the pre-trained RNN, to obtain speech data of each phoneme of the target text. The speech data of each phoneme includes the first speech data corresponding to the first phoneme and the second speech data corresponding to the second phoneme.

It should be understood that another network structure other than the RNN may be further included in a process of processing the first audio feature of the first phoneme and the second audio feature of the second phoneme. This is not limited in this application. For example, an audio feature of a phoneme may be processed by using a network structure of Taco2, for example, an LSTM, a linear projection (linear projection) layer, and a pre-net (Pre-net) layer are sequentially included.

In an existing implementation, in a process of processing an audio feature by using an RNN to obtain speech data, for each frame of a phoneme and adjacent frames of phonemes, an input of a hidden layer of the RNN not only includes an output obtained by processing an audio feature of a current frame by an input layer, but also includes an output obtained by processing an audio feature of a previous frame by a hidden layer. That is, for each phoneme unit, an autoregressive manner is used inside the phoneme unit, and the autoregressive manner is also used between different phonemes. For example, a first target audio feature $x_{t-1}$ and a second target audio feature $x_t$ are audio features of adjacent frames of different phonemes. When the RNN processes the second target audio feature $x_t$, a result obtained by processing the second target audio feature $x_t$ by the input layer of the RNN may be used as an input of the hidden layer of the RNN. In addition, an output $s_{t-1}$ of the hidden layer obtained after the hidden layer of the RNN processes a result obtained by processing the first target audio feature $x_t$ by the input layer is also used as an input of the hidden layer of the RNN. It is equivalent to that, for each phoneme unit, the autoregressive manner is used inside the phoneme unit, and the autoregressive manner is also used between different phonemes. The autoregressive manner used between the different phonemes greatly increases computing power and processing time required by the RNN to process the audio feature.

In this embodiment of this application, the target RNN may concurrently process the first audio feature and the second audio feature, to reduce computing power and processing time required by the RNN to process the audio feature. The concurrency means that the target RNN may also perform a process of calculating the second speech data based on the second audio feature in a process of calculating the first speech data based on the first audio feature.

More specifically, the target RNN includes a hidden layer and an output layer, and the first audio feature and the second audio feature may be audio features of a plurality of frames. For example, the first target audio feature is an audio feature of a last frame in the first audio feature, and the second target audio feature is an audio feature of a first frame in the second audio feature. That the target RNN calculates speech data may include:

The hidden layer starts to process the first target audio feature, the hidden layer calculates an output of a first hidden sub-layer, the output layer starts to process the output of the first hidden sub-layer, and the output layer calculates speech data.

The hidden layer starts to process the second target audio feature, the hidden layer calculates an output of a second hidden layer, the output layer starts to process the output of the second hidden layer, and the output layer calculates speech data.

In this embodiment, the concurrency means that the hidden layer of the target RNN starts to process the second target audio feature before the hidden layer calculates the output of the first hidden sub-layer. In other words, time at which the hidden layer of the target RNN starts to process the second target audio feature does not depend on time at which the hidden layer completes calculation of the output of the first hidden sub-layer, but depends on obtaining time of the second target audio feature. After the second target audio feature is obtained, the hidden layer of the target RNN may directly start to process the second target audio feature.

A non-autoregressive manner may be used between different phonemes, to implement that the target RNN can concurrently process the first audio feature and the second audio feature.

Specifically, duration of the first phoneme is N frames, the quantity of the first audio features is N, each of the N first audio features corresponds to one of the N frames, and the N first audio features include the first target audio feature. The first target audio feature is an audio feature of the last but one frame in the N first audio features. The second phoneme is used for presentation in M frames. A quantity of the second audio features is M, and each of the M second audio features corresponds to one of the M frames. The M second audio features include the second target audio feature. The second target audio feature is an audio feature of a first frame in the M second audio features. That is, the first target audio feature and the second target audio feature are audio features of adjacent frames of different phonemes.

The N first audio features further include a third target audio feature, and the third target audio feature is an audio feature of a penultimate frame in the N first audio features. That is, the first target audio feature and the third target audio feature are audio features of adjacent frames of a same phoneme.

When the RNN processes the third audio feature, the hidden layer may determine an output of a third hidden sub-layer based on the third target audio feature. Specifically, the hidden layer may determine the output of the third hidden sub-layer based on an output of the input layer obtained after the input layer of the RNN processes the third target audio feature. The output layer may determine third speech sub-data based on the output of the third hidden sub-layer. The third speech sub-data may be a mel spectrogram MEL or a bark spectrogram Bark.

When the RNN processes the first audio feature, the hidden layer may determine the output of the first hidden sub-layer based on the first target audio feature and the output of the third hidden sub-layer, and the output layer may determine first speech sub-data based on the output of the first hidden layer. It is equivalent to that, for each frame of a same phoneme, the input of the hidden layer of the RNN not only includes an output obtained by processing an audio feature of a current frame by the input layer, but also includes an output obtained by processing an audio feature of a previous frame by the hidden layer. That is, for each phoneme unit, the autoregressive manner is used inside the phoneme unit.

When the RNN processes the second audio feature, the hidden layer may further determine an output of a second hidden sub-layer based on the second target audio feature, and the output layer may determine second speech sub-data based on the output of the second hidden sub-layer. Different from the existing implementation in which the hidden layer may determine the output of the second hidden sub-layer based on the second target audio feature and the output of the first hidden sub-layer, in this embodiment, the output of the first hidden sub-layer is not used as the input of the hidden layer when the hidden layer determines the output of the second hidden sub-layer.

Figure 6:
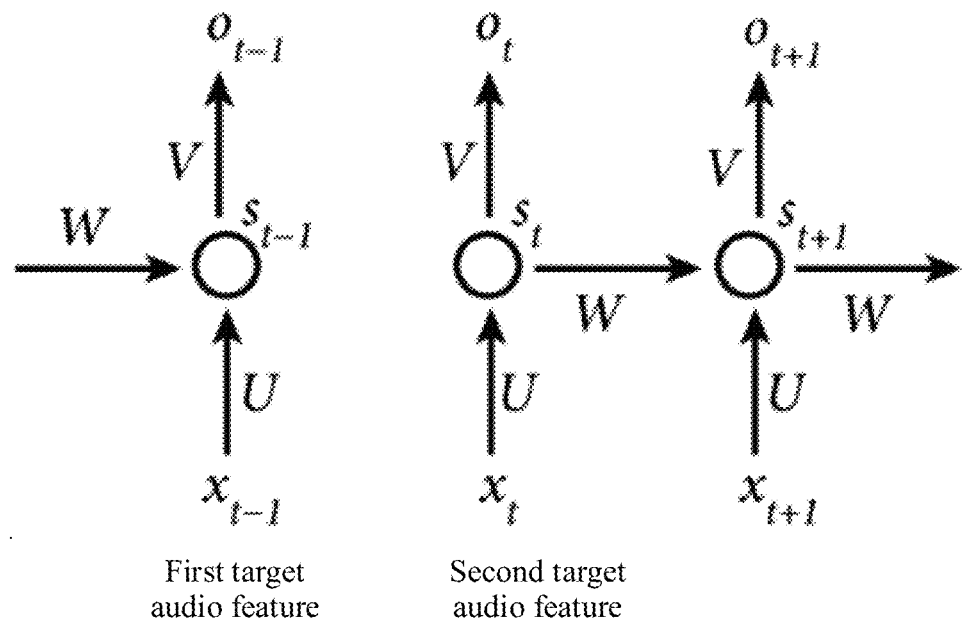
FIG. 6 is a schematic diagram of a text data processing method according to an embodiment of this application.

For example, refer to FIG. 6. The first target audio feature $x_{t-1}$ and the second target audio feature $x_t$ are audio features of adjacent frames of different phonemes. When the RNN processes the second target audio feature $x_t$, a result obtained by processing the second target audio feature $x_t$ by the input layer U of the RNN may be used as the input of the hidden layer of the RNN. In addition, an output $s_{t-1}$ of the hidden layer obtained after the hidden layer of the RNN processes a result obtained by processing the first target audio feature $x_t$ by the input layer U is not used as the input of the hidden layer of the RNN. It is equivalent to that, when the RNN processes an audio feature of the last frame in two adjacent frames between different phonemes, the input of the hidden layer does not include an output obtained by processing the audio feature of the previous frame by the hidden layer. That is, for different phoneme units, the autoregressive manner is not used between the different phonemes. This reduces computing power and processing time required by the RNN to process the audio feature.

It should be understood that, when the RNN processes the second target audio feature, the input of the hidden layer of the RNN includes only the result obtained by processing the second target audio feature by the input layer of the RNN. This is not limited in embodiments of this application.

In this embodiment of this application, after speech data of all frame of each phoneme is obtained, the speech data may be concatenated in a sequence of a quantity of frames, to obtain a speech data processing result, and the speech data processing result may be further compensated by using a post-net (Post-net).

In a possible implementation, before determining the output of the first hidden sub-layer, the hidden layer may determine the output of the second hidden sub-layer based on the second audio feature.

In the existing implementation, when the RNN processes the audio feature to obtain the speech data, for adjacent frames of different phonemes, the input of the hidden layer of the RNN not only includes the output obtained by processing the audio feature of the current frame by the input layer, but also includes the output obtained by processing the audio feature of the previous frame by the hidden layer. Therefore, when processing the audio feature of the last frame in the two adjacent frames between different phonemes, the RNN can process the audio feature of the current frame only after waiting for the hidden layer to process the audio feature of the previous frame and obtain the output of the hidden layer.

In this embodiment of this application, when the RNN processes the audio feature of the last frame in the two adjacent frames between different phonemes, the input of the hidden layer does not include the output obtained by processing the audio feature of the previous frame by the hidden layer, so that when processing the audio feature of the last frame in the two adjacent frames between different phonemes, the RNN can process the audio feature of the current frame without waiting for the hidden layer to process the audio feature of the previous frame and obtain the output of the hidden layer. That is, the hidden layer may be configured to determine the output of the second hidden sub-layer based on the second audio feature before determining the output of the first hidden sub-layer, thereby further reducing time overheads for processing the audio feature by the RNN.

404: Obtain, by using a vocoder and based on the first speech data and the second speech data, audio corresponding to the first phoneme and audio corresponding to the second phoneme.

The step 404 may be performed by the electronic device or the server.

In this embodiment of this application, after the first speech data and the second speech data are obtained, the first speech data and the second speech data may be used as an input of the vocoder, to output audio. Specifically, after speech data corresponding to the target text is obtained, the speech data may be used as the input of the vocoder, to output audio of the target text. The audio includes the audio corresponding to the first phoneme and the audio corresponding to the second phoneme.

Embodiments of this application provide a text data processing method. The method includes: obtaining target text, where a phoneme of the target text includes a first phoneme and a second phoneme that are adjacent to each other; performing feature extraction on the first phoneme and the second phoneme, to obtain a first audio feature of the first phoneme and a second audio feature of the second phoneme; obtaining, by using a target recurrent neural network RNN and based on the first audio feature, first speech data corresponding to the first phoneme, and obtaining, by using the target RNN and based on the second audio feature, second speech data corresponding to the second phoneme, where a step of obtaining the first speech data corresponding to the first phoneme and a step of obtaining the second speech data corresponding to the second phoneme are concurrently performed; and obtaining, by using a vocoder and based on the first speech data and the second speech data, audio corresponding to the first phoneme and audio corresponding to the second phoneme. In this way, the target RNN can concurrently process the first audio feature and the second audio feature. This decouples a processing process of the first audio feature and a processing process of the second audio feature, and reduces duration for processing the audio feature by the target RNN.

The following describes how to obtain the TTS model (including an RNN and a network used to perform feature extraction) in the foregoing embodiment through model training.

A speech synthesis technology (that is, a technology for obtaining corresponding audio based on target text) may be classified, based on a service providing manner, into speech synthesis based on a cloud engine (which may be briefly referred to as "online speech synthesis") and speech synthesis based on a local engine (which may be briefly referred to as "on-device speech synthesis"). The online speech synthesis has features such as high naturalness, high real-time performance, and no consumption of client device resources, but has obvious disadvantages. Because an application (application, APP) that uses speech synthesis can send a large segment of text to a server at a time, however, speech data synthesized by the server is sent back, in segments, to a client on which the APP is installed. Even if the speech data is compressed, a speech data volume is large. If a network environment is unstable, the online synthesis becomes slow and coherent synthesis cannot be implemented. The on-device synthesis can be independent of a network, which can ensure stability of a synthesis service and user privacy. The on-device synthesis poses a higher requirement on a model. The model is required to run quickly and can run on a terminal device (for example, an IoT device such as a mobile phone, a speaker, and a large screen) in real time. In addition, the model and a software package occupy small storage space (for example, less than 30 MB), and does not significantly increase load of a device. Voice quality of an on-device synthesis model should be similar to that of on-cloud TTS, to ensure experience. A knowledge distillation manner may be used to lightweight the on-device TTS model, so that the on-device TTS model can run on the terminal device in real time.

In this embodiment of this application, the target RNN is obtained by performing knowledge distillation on a student RNN by using a teacher RNN.

First, full model training may be performed, to be specific, a teacher TTS model (including a teacher RNN and a teacher feature extraction network) with high data processing precision is obtained through training, and then knowledge distillation training may be performed on a student TTS model (including a student RNN and a student feature extraction network) by using the teacher TTS model, to obtain a compressed TTS model (including the target RNN and a target feature extraction network) in this embodiment of this application.

In a process of performing knowledge distillation, construction of a training loss specifically includes but is not limited to the following three manners.

In a possible implementation, the target RNN is obtained by performing knowledge distillation on the student RNN by using the teacher RNN and based on a first target loss, and the first target loss indicates a difference between a first output and a second output. The first output is an output of an output layer of the teacher RNN, and the second output is an output of an output layer of the student RNN.

In this embodiment of this application, a loss may be constructed based on speech data (for example, a mel spectrogram or a bark spectrogram) output by an output layer of the RNN. For example, a mel spectrogram distillation (mel spectrogram distillation, MSD) manner may be used. In this way, the student TTS model can learn a final output of the teacher TTS model.

In a possible implementation, the target RNN is obtained by performing knowledge distillation on the student RNN by using the teacher RNN and based on a first target loss, and the first target loss indicates a difference between a first output and a second output. The first output is an output of an intermediate layer of the teacher RNN, and the second output is an output of an intermediate layer of the student RNN.

In a possible implementation, the first phoneme and the second phoneme may be processed by using the target feature extraction network, to obtain the first audio feature of the first phoneme and the second audio feature of the second phoneme. The target feature extraction network is obtained by performing knowledge distillation on the student feature extraction network by using the teacher feature extraction network and based on a second target loss, and the second target loss is related to a difference between a third output and a fourth output. The third output is an output of an intermediate layer of the teacher feature extraction network, and the fourth output is an output of an intermediate layer of the student feature extraction network.

For example, an intermediate representation distillation (intermediate representation distillation, IRD) manner may be used in this embodiment of this application. A loss used for knowledge distillation is: $L_{HRD}=\Sigma_{i\in I}\|K_S^i W^i - K_T^i\|_2$. Ks and KT are respectively outputs of intermediate layers (which may be intermediate layers of RNNs or intermediate layers of feature extraction networks) of the student TTS model and the teacher TTS model, and Wi is a parameter that is of an $i^{th}$ layer in the student TTS model and that needs to be learned. In this way, an output of each layer of the student TTS model is similar to an output result of the teacher TTS model.

In a possible implementation, the first phoneme and the second phoneme may be processed by using the target feature extraction network, to obtain the first audio feature of the first phoneme and the second audio feature of the second phoneme. The target feature extraction network is obtained by performing knowledge distillation on the student feature extraction network by using the teacher feature extraction network and based on a second target loss, and the second target loss indicates a difference between a third output and a fourth output. The third output is an output of an output layer of the teacher feature extraction network, and the fourth output is an output of an output layer of the student feature extraction network.

In this embodiment of this application, a prosody distillation (prosody distillation, PD) manner may be used. In this way, the student TTS model can learn a prosody prediction result of the teacher TTS model. A loss function used for knowledge distillation may be: $L_{PD}=L_d^{ST}+L_f^{ST}+L_e^{ST}+\|K_S^f W^f - K_T^f\|_2+\|K_S^e W^e - K_T^e\|_2$. In the formula, $L_d^{ST}$, $L_f^{ST}$, and $L_e^{ST}$ respectively represent a second-order norm between duration predicted by the student TTS model and the teacher TTS model, a second-order norm between pitches predicted by the student TTS model and the teacher TTS model, and a second-order norm between energy predicted by the student TTS model and the teacher TTS model, $K_S^f$ and $K_S^e$ represent weights of last convolutional layers of a pitch prediction module and an energy prediction module, and $W^f$ and $W^e$ represent matrices that can be trained to align parameter dimensions.

This embodiment of this application provides a model distillation method. A full teacher TTS model is first trained, and then a small student TTS model is designed. A plurality of distillation methods can be used to train the student TTS model, including but not limited to the mel spectrogram distillation MSD manner, the intermediate representation distillation IRD manner, the prosody distillation PD manner, and the like.

The following describes the text data processing method provided in embodiments of this application from a perspective of a software module.

Figure 7:
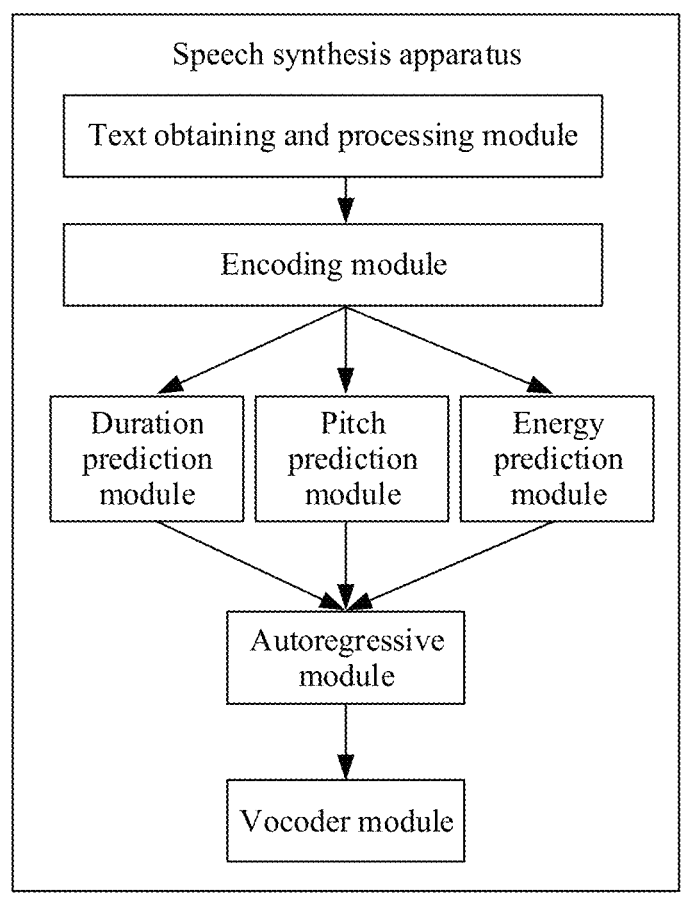
FIG. 7 is a schematic diagram of a software architecture of a text data processing method according to an embodiment of this application.

Refer to FIG. 7. This embodiment of this application may include a text obtaining and processing module, an encoding module, a prosody prediction module, an autoregressive module, and a vocoder module. The text obtaining and processing module may be configured to: obtain to-be-processed target text, and preprocess the target text. The preprocessing may include text analysis. The text analysis may be syntax analysis to obtain a text feature. The text feature may include but is not limited to: a phoneme sequence, a part-of-speech, a word length, and a prosody pause. For details, refer to the description of the step 401 in the foregoing embodiment. Details are not described herein again.

The encoding module may be configured to encode processed text data to obtain a feature vector representation. The prosody prediction module may be configured to predict duration, a pitch, and energy. The prosody prediction module may include a duration prediction module, a pitch prediction module, and an energy prediction module. The duration prediction module may be configured to predict the duration based on a feature vector output through encoding. The pitch prediction module may be configured to predict the pitch based on the feature vector output through encoding. The energy prediction module may be configured to predict the energy based on the feature vector output through encoding. The encoding module can output an audio feature. For details, refer to the description of the step 402 in the foregoing embodiment. Details are not described herein again.

The autoregressive module may superimpose three outputs of the duration module, the pitch module, and the energy module, and output a corresponding spectrogram feature (referred to as speech data in the foregoing embodiment) in an autoregressive manner. For details, refer to the description of the step 403 in the foregoing embodiment. Details are not described herein again. The vocoder module may convert an output of the autoregressive module into a sound waveform (referred to as audio in the foregoing embodiment). For details, refer to the description of the step 404 in the foregoing embodiment. Details are not described herein again.

Figure 8:
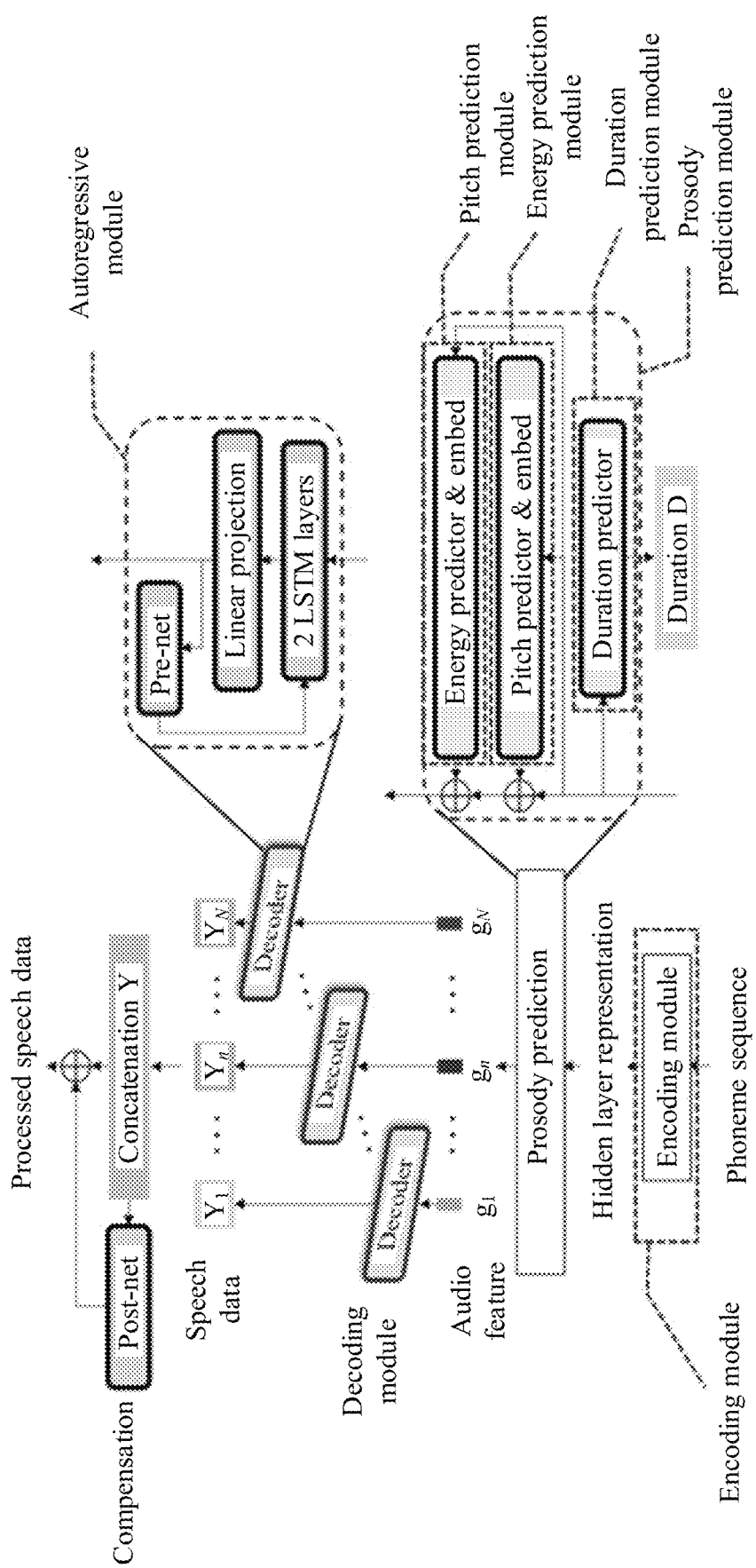
FIG. 8 is a schematic diagram of a software architecture of a text processing method according to an embodiment of this application.

More specifically, refer to FIG. 8. The encoding module may encode a phoneme sequence (phoneme sequence X) of input target text, to obtain a hidden layer representation (Hidden representation H), and then prosody prediction (Prosody injector) is performed on the hidden layer representation. The prosody prediction includes the duration prediction module, the pitch prediction module, and the energy prediction module, and an output of the prosody prediction is an audio feature (Sum G). The audio feature includes audio features (g1, ..., gn, ..., gN) of all frames. Then, the autoregressive module (for example, an LUP layer (a dimension of the LUP layer is 512), three filter layers, and a bidirectional recurrent neural network layer that are serially connected and shown in FIG. 8, where each filter layer includes 512 convolution kernels (kernel), a size of each convolution kernel is 5, the bidirectional recurrent neural network layer includes a hidden layer, and a dimension of the bidirectional circular neural network layer is 512) may process the audio feature to obtain speech data (Y1, ..., Yn, ..., YN). After compensation of the speech data, processed speech data (for example, a mel spectrogram shown in FIG. 8) may be obtained.

The following describes an application architecture in an embodiment of this application from a perspective of model training and inference.

Figure 9:
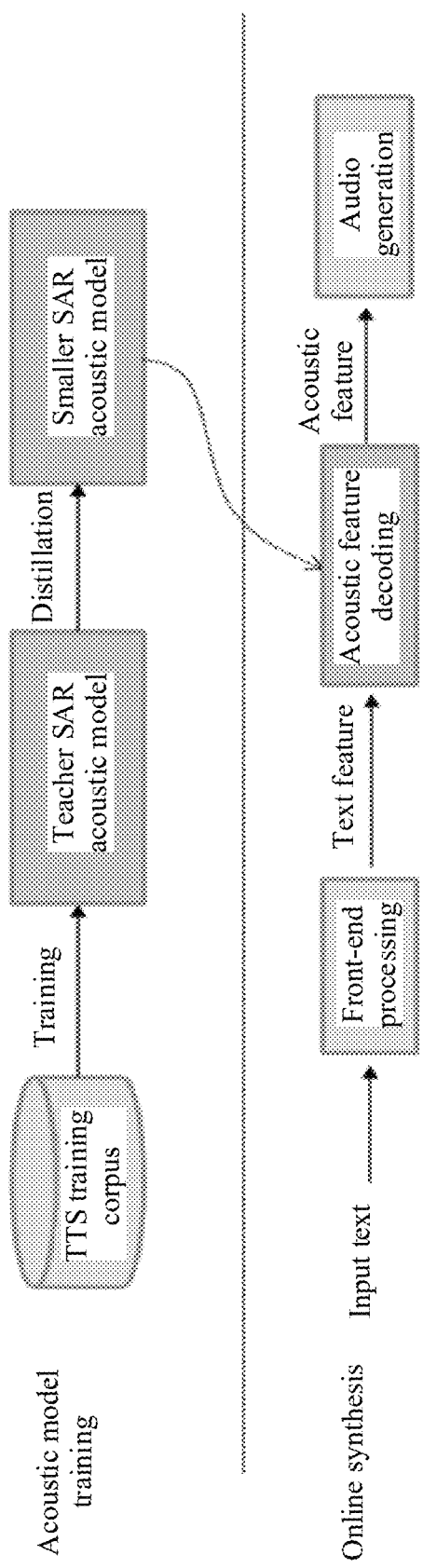
FIG. 9 is a schematic diagram of a software architecture of a text processing method according to an embodiment of this application.

Refer to FIG. 9. In a model training phase (described as acoustic model training in FIG. 9), a teacher TTS model (for example, a teacher SAR acoustic model in FIG. 9) may be obtained through training based on a TTS training corpus (TTS training corpus). Then, knowledge distillation is performed on the teacher TTS model to obtain a target TTS model (for example, a small SAR acoustic model in FIG. 9). Online speech synthesis may be performed based on the target TTS model obtained through training. Specifically, input text (that is, the target text in the foregoing embodiment) may be obtained, front-end processing is performed on the obtained target text to obtain a text feature, the text feature is processed (described as acoustic feature decoding in FIG. 9) by using the target TTS model, to obtain speech data (described as an acoustic feature in FIG. 9), and audio synthesis is performed based on the acoustic feature.

Figure 10:
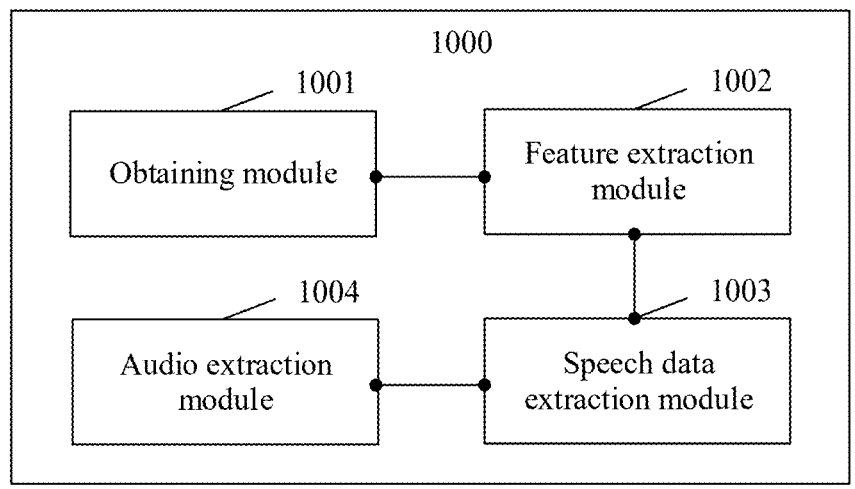
FIG. 10 is a schematic diagram of a text processing apparatus according to an embodiment of this application.

The following describes a text processing apparatus provided in embodiments of this application from a perspective of an apparatus. FIG. 10 is a schematic diagram of a text processing apparatus 1000 according to an embodiment of this application. As shown in FIG. 10, the text processing apparatus 1000 provided in this embodiment of this application includes an obtaining module 1001, a feature extraction module 1002, a speech data extraction module 1003, and an audio extraction module 1004.

The obtaining module 1001 is configured to obtain target text, where a phoneme of the target text includes a first phoneme and a second phoneme that are adjacent to each other.

For a specific description of the obtaining module 1001, refer to the description of the step 401. Details are not described herein again.

The feature extraction module 1002 is configured to perform feature extraction on the first phoneme and the second phoneme to obtain a first audio feature of the first phoneme and a second audio feature of the second phoneme.

For a specific description of the feature extraction module 1002, refer to the description of the step 402. Details are not described herein again.

The speech data extraction module 1003 is configured to: obtain, by using a target recurrent neural network RNN and based on the first audio feature, first speech data corresponding to the first phoneme, and obtain, by using the target RNN and based on the second audio feature, second speech data corresponding to the second phoneme, where a step of obtaining the first speech data corresponding to the first phoneme and a step of obtaining the second speech data corresponding to the second phoneme are concurrently performed.

For a specific description of the speech data extraction module 1003, refer to the description of the step 403. Details are not described herein again.

The audio extraction module 1004 is configured to obtain, by using a vocoder and based on the first speech data and the second speech data, audio corresponding to the first phoneme and audio corresponding to the second phoneme.

For a specific description of the audio extraction module 1004, refer to the description of the step 404. Details are not described herein again.

In a possible implementation, the target RNN includes a hidden layer and an output layer. The speech data extraction module is configured to: determine, by using the hidden layer, an output of a first hidden layer based on the first audio feature,
  determine, by using the output layer, the first speech data based on the output of the first hidden layer,
  determine, by using the hidden layer, an output of a second hidden layer based on the second audio feature, and
  determine, by using the output layer, the second speech data based on the output of the second hidden layer, where the output of the first hidden layer is not used as an input of the hidden layer when the hidden layer determines the output of the second hidden layer.

In a possible implementation, duration of the first phoneme is N frames, a quantity of first audio features is N, each of the N first audio features corresponds to one of the N frames, the N first audio features include a first target audio feature and a third target audio feature, a frame corresponding to the first target audio feature is an adjacent frame before a frame corresponding to the third target audio feature, and the first speech data includes first speech sub-data corresponding to the first target audio feature and third speech sub-data corresponding to the third target audio feature.

The speech data extraction module is configured to:
  determine, by using the hidden layer, an output of a third hidden sub-layer based on the third target audio feature, determine, by using the hidden layer, an output of a first hidden sub-layer based on the first target audio feature and the output of the third hidden sub-layer, determine, by using the output layer, the third speech sub-data based on the output of the third hidden sub-layer, and determine, by using the output layer, the first speech sub-data based on the output of the first hidden sub-layer.

In a possible implementation, the first audio feature includes at least one of the following information: fundamental frequency information or energy information of the first phoneme, and the second audio feature includes at least one of the following information: fundamental frequency information or energy information of the second phoneme.

In a possible implementation, the first speech data and the second speech data each are a mel spectrogram MEL or a bark spectrogram Bark.

In a possible implementation, the target RNN is obtained by performing knowledge distillation on a student RNN by using a teacher RNN.

In a possible implementation, the target RNN is obtained by performing knowledge distillation on the student RNN by using the teacher RNN and based on a first target loss, and the first target loss indicates a difference between a first output and a second output.

The first output is an output of an output layer of the teacher RNN, and the second output is an output of an output layer of the student RNN.

Alternatively, the first output is an output of an intermediate layer of the teacher RNN, and the second output is an output of an intermediate layer of the student RNN.

In a possible implementation, the feature extraction module is configured to: process the first phoneme and the second phoneme by using a target feature extraction network, to obtain the first audio feature of the first phoneme and the second audio feature of the second phoneme, where the target feature extraction network is obtained by performing knowledge distillation on a student feature extraction network by using a teacher feature extraction network and based on a second target loss, and the second target loss indicates a difference between a third output and a fourth output.

The third output is an output of an output layer of the teacher feature extraction network, and the fourth output is an output of an output layer of the student feature extraction network.

Alternatively, the third output is an output of an intermediate layer of the teacher feature extraction network, and the fourth output is an output of an intermediate layer of the student feature extraction network.

Figure 11:
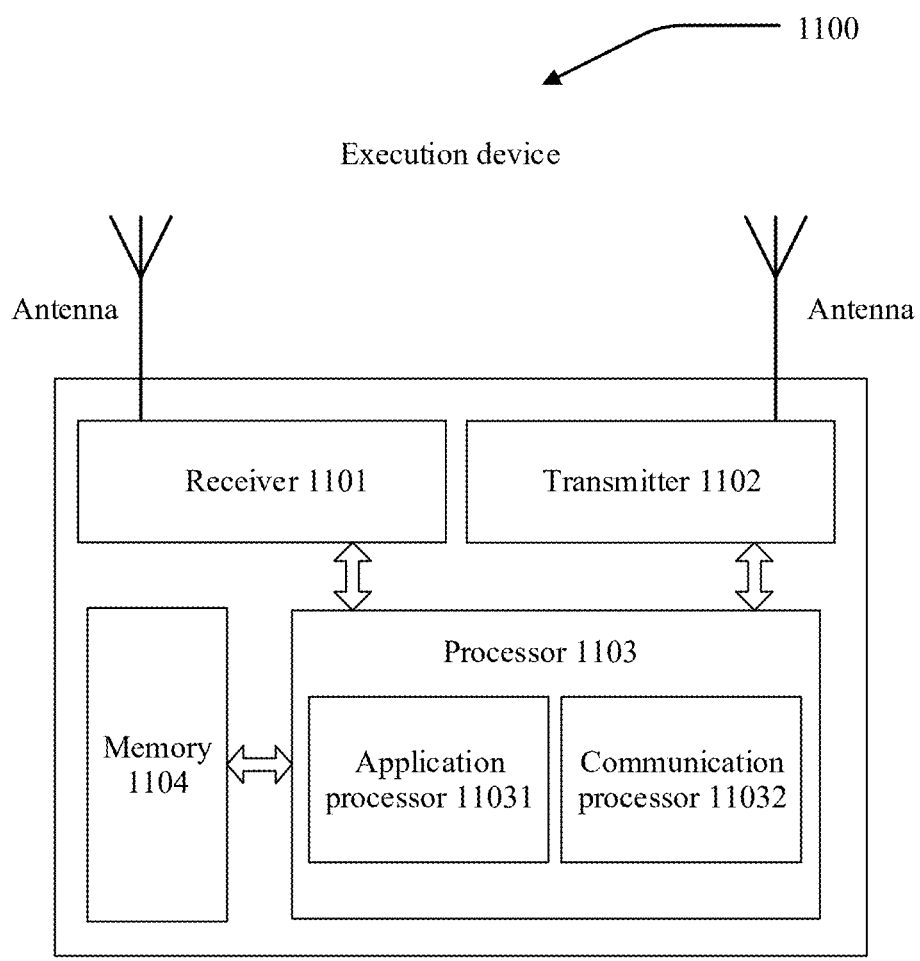
FIG. 11 is a schematic diagram of a structure of an execution device according to an embodiment of this application.

The following describes an execution device provided in an embodiment of this application. FIG. 11 is a schematic diagram of a structure of an execution device according to an embodiment of this application. The execution device 1100 may be specifically a mobile phone, a tablet computer, a laptop computer, a smart wearable device, a server, and the like. This is not limited herein. The data processing apparatus described in the embodiment corresponding to FIG. 11 may be deployed on the execution device 1100, and is configured to implement a data processing function in the embodiment corresponding to FIG. 11. Specifically, the execution device 1100 includes a receiver 1101, a transmitter 1102, a processor 1103, and a memory 1104 (there may be one or more processors 1103 in the execution device 1100, and one processor is used as an example in FIG. 11). The processor 1103 may include an application processor 11031 and a communication processor 11032. In some embodiments of this application, the receiver 1101, the transmitter 1102, the processor 1103, and the memory 1104 may be connected by using a bus or in another manner.

The memory 1104 may include a read-only memory and a random access memory, and provide an instruction and data to the processor 1103. A part of the memory 1104 may further include a non-volatile random access memory (non-volatile random access memory, NVRAM). The memory 1104 stores a processor and operation instructions, an executable module or a data structure, or a subset thereof or an extended set thereof. The operation instructions may include various operation instructions for implementing various operations.

The processor 1103 controls an operation of the execution device. In a specific application, components of the execution device are coupled together by using a bus system. In addition to a data bus, the bus system may further include a power bus, a control bus, a status signal bus, and the like. However, for clarity of description, various types of buses in the figure are marked as the bus system.

The method disclosed in the foregoing embodiments of this application may be applied to the processor 1103, or implemented by the processor 1103. The processor 1103 may be an integrated circuit chip and has a signal processing capability. In an implementation process, each step of the foregoing method may be completed by using an integrated logic circuit of hardware in the processor 1103 or an instruction in a form of software. The processor 1103 may be a general-purpose processor, a digital signal processor (digital signal processor, DSP), a microprocessor, or a microcontroller. The processor 1103 may further include an application-specific integrated circuit (application-specific integrated circuit, ASIC), a field-programmable gate array (field-programmable gate array, FPGA) or another programmable logic device, a discrete gate or transistor logic device, or a discrete hardware component. The processor 1103 may implement or perform the methods, the steps, and logical block diagrams that are disclosed in embodiments of this application. The general-purpose processor may be a microprocessor, or the processor may be any conventional processor or the like. The steps of the method disclosed with reference to embodiments of this application may be directly performed and completed by using a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1104, and the processor 1103 reads information in the memory 1104 and completes the steps of the foregoing method in combination with hardware of the processor.

The receiver 1101 may be configured to: receive input digit or character information, and generate a signal input related to related setting and function control of the execution device. The transmitter 1102 may be configured to output digital or character information through a first interface. The transmitter 1102 may be further configured to send an instruction to a disk group through the first interface, to modify data in the disk group. The transmitter 1102 may further include a display device such as a display.

In this embodiment of this application, in one case, the processor 1103 is configured to perform the text data processing method in the embodiment corresponding to FIG. 4.

Figure 12:
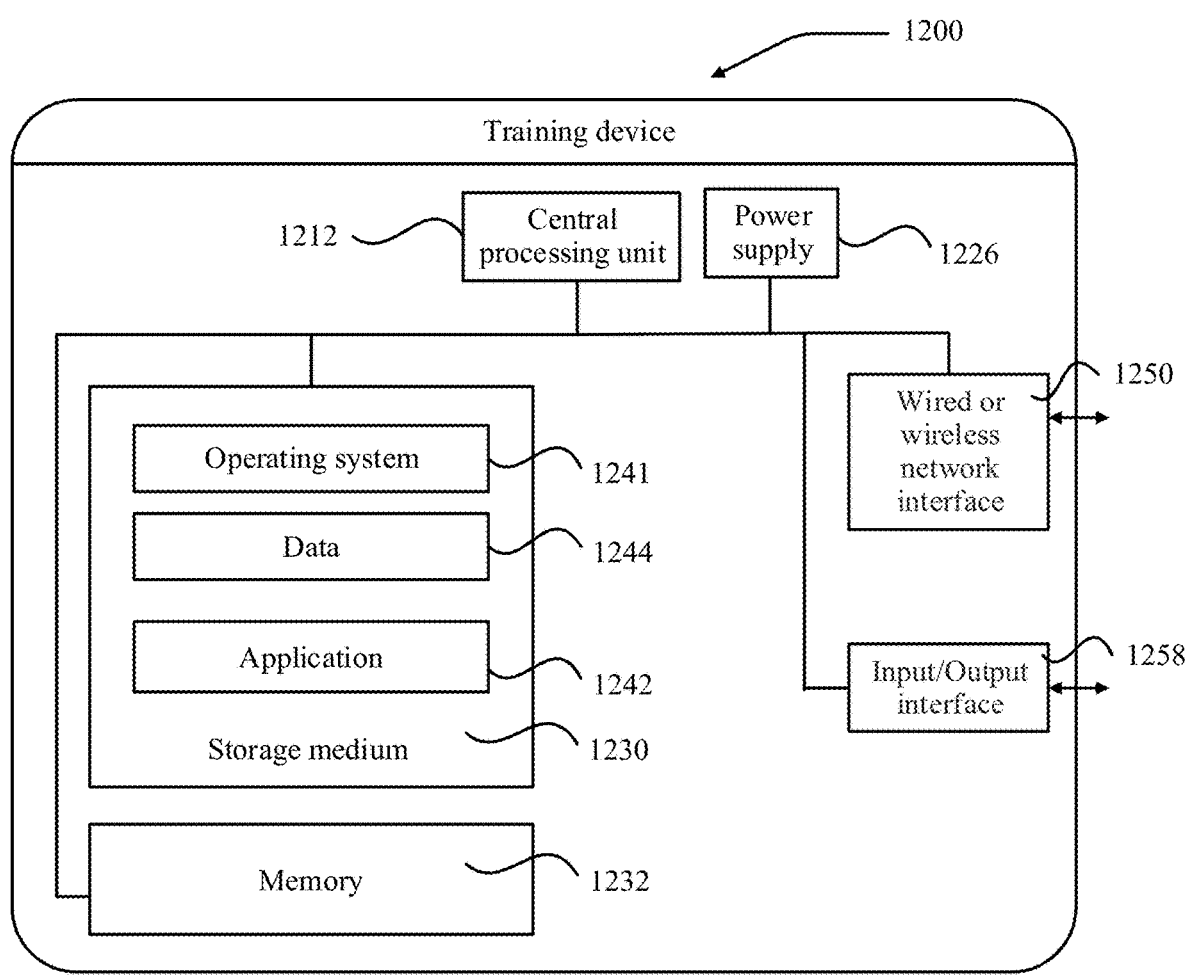
FIG. 12 is a schematic diagram of a structure of a training device according to an embodiment of this application.

An embodiment of this application further provides a training device. FIG. 12 is a schematic diagram of a structure of a training device according to an embodiment of this application. Specifically, the training device 1200 is implemented by one or more servers. The training device 1200 may differ greatly due to different configurations or performance, and may include one or more central processing units (central processing units, CPUs) 1212 (for example, one or more processors), a memory 1232, and one or more storage media 1230 (for example, one or more massive storage devices) that store an application 1242 or data 1244. The memory 1232 and the storage medium 1230 each may be a transient storage or a persistent storage. A program stored in the storage medium 1230 may include one or more modules (not shown in the figure), and each module may include a series of instruction operations for the training device. Further, the central processing unit 1212 may be configured to communicate with the storage medium 1230, and perform, on the training device 1200, a series of instruction operations in the storage medium 1230.

The training device 1200 may further include one or more power supplies 1226, one or more wired or wireless network interfaces 1250, one or more input/output interfaces 1258, or one or more operating systems 1241, such as Windows Server™, Mac OS X™, Unix™, Linux™, and FreeBSD™.

Specifically, the training device may perform the steps related to model training in the foregoing embodiment.

An embodiment of this application further provides a computer program product. When the computer program product runs on a computer, the computer is enabled to perform steps performed by the execution device or steps performed by the training device.

An embodiment of this application further provides a computer-readable storage medium. The computer-readable storage medium stores a program used for signal processing. When the program is run on a computer, the computer is enabled to perform steps performed by the execution device or steps performed by the training device.

The execution device, the training device, or the terminal device in embodiments of this application may be specifically a chip. The chip includes a processing unit and a communication unit. The processing unit may be, for example, a processor, and the communication unit may be, for example, an input/output interface, a pin, or a circuit. The processing unit may execute computer-executable instructions stored in a storage unit, so that a chip in the execution device performs the data processing method described in the embodiments, or a chip in the training device performs the data processing method described in the embodiments. Optionally, the storage unit is a storage unit in the chip, for example, a register or a cache. Alternatively, the storage unit may be a storage unit, such as a read-only memory (read-only memory, ROM), another type of static storage device that can store static information and instructions, or a random access memory (random access memory, RAM), in a wireless access device but outside the chip.

Figure 13:
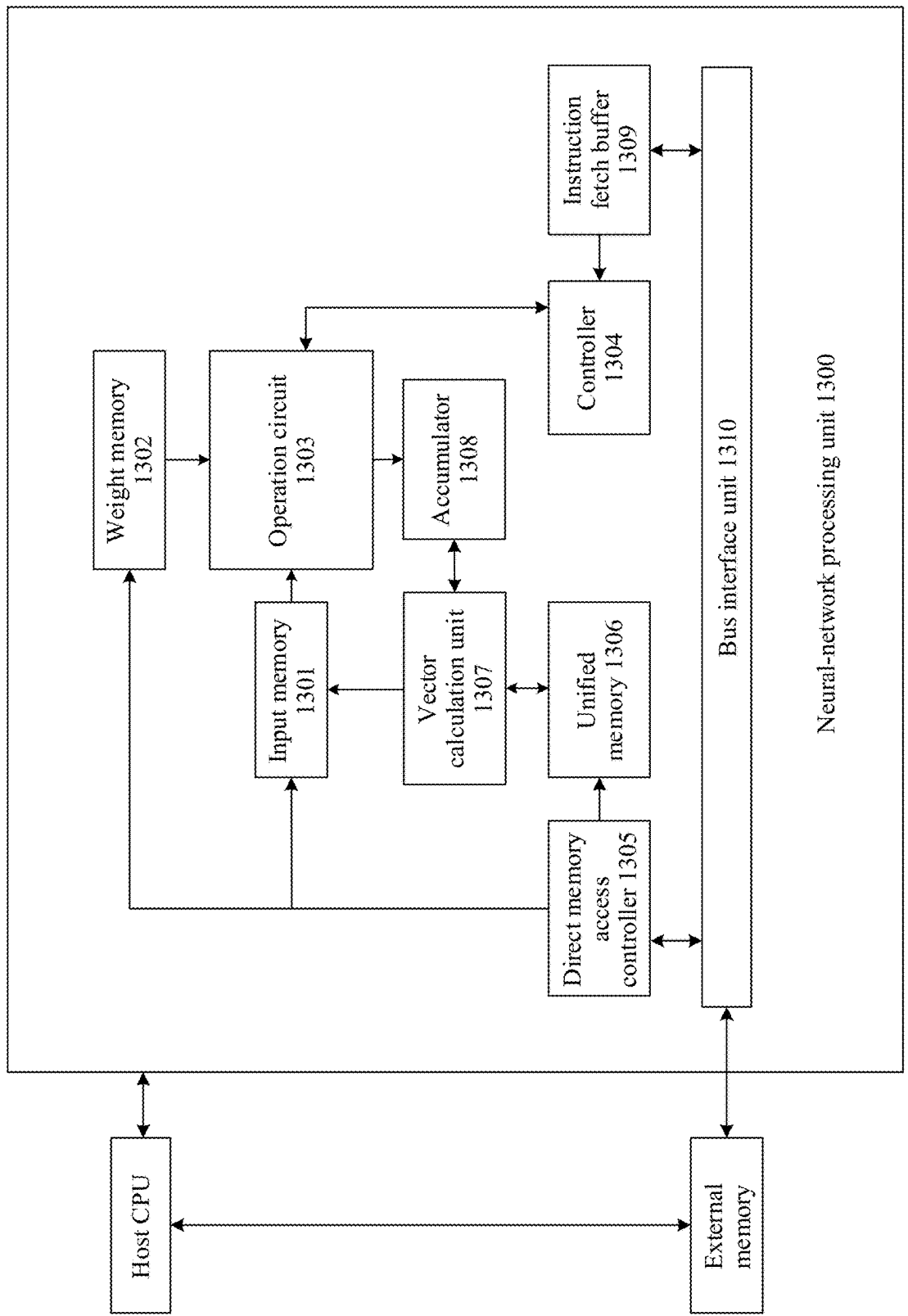
FIG. 13 is a schematic diagram of a structure of a chip according to an embodiment of this application.

Specifically, FIG. 13 is a schematic diagram of a structure of a chip according to an embodiment of this application. The chip may be represented as a neural-network processing unit NPU 1300. The NPU 1300 is mounted to a host CPU (Host CPU) as a coprocessor, and the host CPU allocates a task. A core part of the NPU is an operation circuit 1303. The operation circuit 1303 is controlled by a controller 1304 to extract matrix data from a memory and perform a multiplication operation.

In some implementations, the operation circuit 1303 includes a plurality of processing units (Process Engines, PEs) inside. In some implementations, the operation circuit 1303 is a two-dimensional systolic array. The operation circuit 1303 may alternatively be a one-dimensional systolic array or another electronic circuit capable of performing mathematical operations such as multiplication and addition. In some implementations, the operation circuit 1303 is a general-purpose matrix processor.

For example, it is assumed that there are an input matrix A, a weight matrix B, and an output matrix C. The operation circuit fetches, from a weight memory 1302, data corresponding to the matrix B, and caches the data on each PE in the operation circuit. The operation circuit fetches data of the matrix A from an input memory 1301, to perform a matrix operation on the matrix B, and stores an obtained partial result or an obtained final result of the matrix in an accumulator (accumulator) 1308.

The unified memory 1306 is configured to store input data and output data. Weight data is directly transferred to the weight memory 1302 by using a direct memory access controller (Direct Memory Access Controller, DMAC) 1305. The input data is also transferred to the unified memory 1306 by using the DMAC.

A BIU is a bus interface unit, namely, a bus interface unit 1310, and is configured to perform interaction between an AXI bus and the DMAC and between the AXI bus and an instruction fetch buffer (Instruction Fetch Buffer, IFB) 1309.

The bus interface unit (Bus Interface Unit, BIU for short) 1310 is used by the instruction fetch buffer 1309 to obtain an instruction from an external memory, and is further used by the direct memory access controller 1305 to obtain raw data of the input matrix A or the weight matrix B from the external memory.

The DMAC is mainly configured to transfer input data in the external DDR memory to the unified memory 1306, transfer weight data to the weight memory 1302, or transfer input data to the input memory 1301.

A vector calculation unit 1307 includes a plurality of operation processing units; and if necessary, performs further processing such as vector multiplication, vector addition, an exponential operation, a logarithmic operation, or value comparison on an output of the operation circuit 1303. The vector calculation unit 1307 is mainly configured to perform network calculation, such as batch normalization (batch normalization), pixel-level summation, and upsampling on a feature plane, at a non-convolutional/fully connected layer in a neural network.

In some implementations, a processed vector output by the vector calculation unit 1307 can be stored in the unified memory 1306. For example, the vector calculation unit 1307 may apply a linear function or a nonlinear function to the output of the operation circuit 1303, for example, perform linear interpolation on a feature plane extracted by a convolutional layer, for another example, add value vectors, to generate an activation value. In some implementations, the vector calculation unit 1307 generates a normalized value, a pixel-level summation value, or both. In some implementations, the processed output vector can be used as an activation input to the operation circuit 1303, for example, to be used in a subsequent layer in the neural network.

The instruction fetch buffer (instruction fetch buffer) 1309 connected to the controller 1304 is configured to store instructions used by the controller 1304.

The unified memory 1306, the input memory 1301, the weight memory 1302, and the instruction fetch buffer 1309 are all on-chip memories. The external memory is private for a hardware architecture of the NPU.

The processor mentioned above may be a general-purpose central processing unit, a microprocessor, an ASIC, or one or more integrated circuits for controlling program execution.

In addition, it should be noted that the described apparatus embodiments are merely examples. The units described as separate parts may or may not be physically separate, and parts displayed as units may or may not be physical units, may be located in a place, or may be distributed on a plurality of network units. Some or all of the modules may be selected based on an actual requirement to achieve the objectives of the solutions of the embodiments. In addition, in the accompanying drawings of the apparatus embodiments provided by this application, connection relationships between modules indicate that the modules have communication connections with each other, which may be specifically implemented as one or more communication buses or signal cables.

Based on the descriptions of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to implement a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to a conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the methods in embodiments of this application.

All or some of the foregoing embodiments may be implemented by software, hardware, firmware, or any combination thereof. When the software is used for implementation, all or some of the embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a training device or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

What is claimed is:

1. A method, comprising:
   obtaining target text, wherein a phoneme of the target text comprises a first phoneme and a second phoneme that is adjacent to first phoneme;
   performing feature extraction on the first phoneme and the second phoneme to obtain a first audio feature of the first phoneme and a second audio feature of the second phoneme;
   obtaining, by using a target recurrent neural network (RNN) and based on the first audio feature, first speech data corresponding to the first phoneme, and obtaining, by using the target RNN and based on the second audio feature, second speech data corresponding to the second phoneme, wherein the first speech data and the second speech data are concurrently obtained; and
   obtaining, by using a vocoder and based on the first speech data and the second speech data, audio corresponding to the first phoneme and audio corresponding to the second phoneme.

2. The method according to claim 1, wherein the target RNN comprises a hidden layer and an output layer, and wherein obtaining the first speech data corresponding to the first phoneme and obtaining the second speech data corresponding to the second phoneme comprises:
   determining, by using the hidden layer, an output of a first hidden layer based on the first audio feature;
   determining, by using the output layer, the first speech data based on the output of the first hidden layer;
   determining, by using the hidden layer, an output of a second hidden layer based on the second audio feature; and
   determining, by using the output layer, the second speech data based on the output of the second hidden layer, wherein the output of the first hidden layer is not used as an input of the hidden layer when the hidden layer determines the output of the second hidden layer.

3. The method according to claim 2, wherein duration of the first phoneme is N frames, a quantity of first audio features is N, each of the N first audio features corresponds to one of the N frames, the N first audio features comprise a first target audio feature and a third target audio feature, a frame corresponding to the first target audio feature is a frame before a frame corresponding to the third target audio feature, and the first speech data comprises first speech sub-data corresponding to the first target audio feature and third speech sub-data corresponding to the third target audio feature;
   wherein the determining, by using the hidden layer, an output of a first hidden layer based on the first audio feature comprises:
   determining, by using the hidden layer, an output of a third hidden sub-layer based on the third target audio feature; and
   determining, by using the hidden layer, an output of a first hidden sub-layer based on the first target audio feature and the output of the third hidden sub-layer; and
   wherein the determining, by using the output layer, the first speech data based on the output of the first hidden layer comprises:
   determining, by using the output layer, the third speech sub-data based on the output of the third hidden sub-layer; and determining, by using the output layer, the first speech sub-data based on the output of the first hidden sub-layer.

4. The method according to claim 1, wherein the first audio feature comprises at least one of fundamental frequency information or energy information of the first phoneme, and wherein the second audio feature comprises at least one of fundamental frequency information or energy information of the second phoneme.

5. The method according to claim 1, wherein the first speech data and the second speech data each are a mel spectrogram (MEL) or a bark spectrogram (Bark).

6. The method according to claim 1, wherein the target RNN is obtained by performing knowledge distillation on a student RNN by using a teacher RNN.

7. The method according to claim 6, wherein:
the target RNN is obtained by performing knowledge distillation on the student RNN by using the teacher RNN and based on a first target loss, and the first target loss indicates a difference between a first output and a second output; and
the first output is an output of an output layer of the teacher RNN, and the second output is an output of an output layer of the student RNN; or
the first output is an output of an intermediate layer of the teacher RNN, and the second output is an output of an intermediate layer of the student RNN.

8. The method according to claim 1, wherein the performing feature extraction on the first phoneme and the second phoneme comprises:
processing the first phoneme and the second phoneme by using a target feature extraction network to obtain the first audio feature of the first phoneme and the second audio feature of the second phoneme, wherein the target feature extraction network is obtained by performing knowledge distillation on a student feature extraction network by using a teacher feature extraction network and based on a second target loss, and the second target loss indicates a difference between a third output and a fourth output; and
the third output is an output of an output layer of the teacher feature extraction network, and the fourth output is an output of an output layer of the student feature extraction network; or
the third output is an output of an intermediate layer of the teacher feature extraction network, and the fourth output is an output of an intermediate layer of the student feature extraction network.

9. An apparatus, wherein the apparatus comprises at least one processor and one or more memories coupled to the at least one processor and storing programming instructions for execution by the at least one processor to cause the apparatus to perform operations comprising:
obtaining target text, wherein a phoneme of the target text comprises a first phoneme and a second phoneme that is adjacent to the first phoneme;
performing feature extraction on the first phoneme and the second phoneme to obtain a first audio feature of the first phoneme and a second audio feature of the second phoneme;
obtaining, by using a target recurrent neural network (RNN) and based on the first audio feature, first speech data corresponding to the first phoneme, and obtaining, by using the target RNN and based on the second audio feature, second speech data corresponding to the second phoneme, wherein the first speech data and the second speech data are concurrently obtained; and
obtaining, by using a vocoder and based on the first speech data and the second speech data, audio corresponding to the first phoneme and audio corresponding to the second phoneme.

10. The apparatus according to claim 9, wherein the target RNN comprises a hidden layer and an output layer, and the operations comprise:
determining, by using the hidden layer, an output of a first hidden layer based on the first audio feature;
determining, by using the output layer, the first speech data based on the output of the first hidden layer;
determining, by using the hidden layer, an output of a second hidden layer based on the second audio feature; and
determining, by using the output layer, the second speech data based on the output of the second hidden layer, wherein the output of the first hidden layer is not used as an input of the hidden layer when the hidden layer determines the output of the second hidden layer.

11. The apparatus according to claim 10, wherein:
duration of the first phoneme is N frames, a quantity of first audio features is N, each of the N first audio features corresponds to one of the N frames, the N first audio features comprise a first target audio feature and a third target audio feature, a frame corresponding to the first target audio feature is a frame before a frame corresponding to the third target audio feature, and the first speech data comprises first speech sub-data corresponding to the first target audio feature and third speech sub-data corresponding to the third target audio feature; and
wherein the operations comprise:
determining, by using the hidden layer, an output of a third hidden sub-layer based on the third target audio feature;
determining, by using the hidden layer, an output of a first hidden sub-layer based on the first target audio feature and the output of the third hidden sub-layer;
determining, by using the output layer, the third speech sub-data based on the output of the third hidden sub-layer; and
determining, by using the output layer, the first speech sub-data based on the output of the first hidden sub-layer.

12. The apparatus according to claim 9, wherein the first audio feature comprises at least one of fundamental frequency information or energy information of the first phoneme, and wherein the second audio feature comprises at least one of fundamental frequency information or energy information of the second phoneme.

13. The apparatus according to claim 9, wherein the first speech data and the second speech data each are a mel spectrogram (MEL) or a bark spectrogram (Bark).

14. The apparatus according to claim 9, wherein the target RNN is obtained by performing knowledge distillation on a student RNN by using a teacher RNN.

15. The apparatus according to claim 14, wherein:
the target RNN is obtained by performing knowledge distillation on the student RNN by using the teacher RNN and based on a first target loss, and the first target loss indicates a difference between a first output and a second output; and
the first output is an output of an output layer of the teacher RNN, and the second output is an output of an output layer of the student RNN; or the first output is an output of an intermediate layer of the teacher RNN, and the second output is an output of an intermediate layer of the student RNN.

16. The apparatus according to claim 9, wherein the operations comprise:
processing the first phoneme and the second phoneme by using a target feature extraction network to obtain the first audio feature of the first phoneme and the second audio feature of the second phoneme, wherein the target feature extraction network is obtained by performing knowledge distillation on a student feature extraction network by using a teacher feature extraction network and based on a second target loss, and the second target loss indicates a difference between a third output and a fourth output; and
the third output is an output of an output layer of the teacher feature extraction network, and the fourth output is an output of an output layer of the student feature extraction network; or
the third output is an output of an intermediate layer of the teacher feature extraction network, and the fourth output is an output of an intermediate layer of the student feature extraction network.

17. A non-transitory computer-readable storage medium, wherein the computer-readable storage medium stores one or more instructions, and when the one or more instructions are executed by one or more computers, the one or more computers are enabled to perform operations comprising:
obtaining target text, wherein a phoneme of the target text comprises a first phoneme and a second phoneme that is adjacent to the first phoneme;
performing feature extraction on the first phoneme and the second phoneme to obtain a first audio feature of the first phoneme and a second audio feature of the second phoneme;
obtaining, by using a target recurrent neural network (RNN) and based on the first audio feature, first speech data corresponding to the first phoneme, and obtaining, by using the target RNN and based on the second audio feature, second speech data corresponding to the second phoneme, wherein the first speech data and the second speech data are concurrently obtained; and
obtaining, by using a vocoder and based on the first speech data and the second speech data, audio corresponding to the first phoneme and audio corresponding to the second phoneme.

18. The non-transitory computer-readable storage medium according to claim 17,
wherein the target RNN comprises a hidden layer and an output layer, and wherein obtaining the first speech data corresponding to the first phoneme and obtaining the second speech data corresponding to the second phoneme comprises:

determining, by using the hidden layer, an output of a first hidden layer based on the first audio feature;
determining, by using the output layer, the first speech data based on the output of the first hidden layer;
determining, by using the hidden layer, an output of a second hidden layer based on the second audio feature; and
determining, by using the output layer, the second speech data based on the output of the second hidden layer, wherein the output of the first hidden layer is not used as an input of the hidden layer when the hidden layer determines the output of the second hidden layer.

19. The non-transitory computer-readable storage medium according to claim 18, wherein duration of the first phoneme is N frames, a quantity of first audio features is N, each of the N first audio features corresponds to one of the N frames, the N first audio features comprise a first target audio feature and a third target audio feature, a frame corresponding to the first target audio feature is a frame before a frame corresponding to the third target audio feature, and the first speech data comprises first speech sub-data corresponding to the first target audio feature and third speech sub-data corresponding to the third target audio feature;
wherein the determining, by using the hidden layer, an output of a first hidden layer based on the first audio feature comprises:
determining, by using the hidden layer, an output of a third hidden sub-layer based on the third target audio feature; and
determining, by using the hidden layer, an output of a first hidden sub-layer based on the first target audio feature and the output of the third hidden sub-layer; and
wherein the determining, by using the output layer, the first speech data based on the output of the first hidden layer comprises:
determining, by using the output layer, the third speech sub-data based on the output of the third hidden sub-layer; and
determining, by using the output layer, the first speech sub-data based on the output of the first hidden sub-layer.

20. The non-transitory computer-readable storage medium according to claim 17, wherein the first audio feature comprises at least one of fundamental frequency information or energy information of the first phoneme, and wherein the second audio feature comprises at least one of fundamental frequency information or energy information of the second phoneme.

* * * * *